United States Patent
Nobayashi

(10) Patent No.: US 10,582,180 B2
(45) Date of Patent: Mar. 3, 2020

(54) DEPTH IMAGING CORRECTION APPARATUS, IMAGING APPARATUS, AND DEPTH IMAGE CORRECTION METHOD

(71) Applicant: CANON KABUSHIKI KAISHA, Tokyo (JP)

(72) Inventor: Kazuya Nobayashi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 116 days.

(21) Appl. No.: 15/416,236

(22) Filed: Jan. 26, 2017

(65) Prior Publication Data
US 2017/0223334 A1 Aug. 3, 2017

(30) Foreign Application Priority Data
Feb. 3, 2016 (JP) .................................. 2016-019227

(51) Int. Cl.
| | |
|---|---|
| *G06T 7/00* | (2017.01) |
| *H04N 5/232* | (2006.01) |
| *H04N 13/00* | (2018.01) |
| *G06K 9/00* | (2006.01) |
| *H04N 13/128* | (2018.01) |
| *G06T 7/571* | (2017.01) |

(Continued)

(52) U.S. Cl.
CPC .......... *H04N 13/128* (2018.05); *G01B 11/24* (2013.01); *G01B 21/045* (2013.01); *G06T 7/571* (2017.01); *H04N 13/15* (2018.05); *H04N 13/254* (2018.05); *H04N 13/257* (2018.05)

(58) Field of Classification Search
CPC .... H04N 13/128; H04N 13/257; H04N 13/15; H04N 13/254; G06T 7/571; G01B 11/24; G01B 21/045

USPC ............................................................. 348/50
See application file for complete search history.

(56) References Cited

U.S. PATENT DOCUMENTS

| | | | | |
|---|---|---|---|---|
| 8,355,565 | B1* | 1/2013 | Yang ....................... | G06T 7/593 |
| | | | | 382/154 |
| 8,977,038 | B2* | 3/2015 | Tian ........................ | G06T 5/005 |
| | | | | 382/154 |

(Continued)

FOREIGN PATENT DOCUMENTS

JP 5066851 B2 11/2012

OTHER PUBLICATIONS

Matsuo, Takuya et al."Weighted Joint Bilateral Filter with Slope Depth Compensation Filter for Depth Map Refinement", VISAPP, 2013.

*Primary Examiner* — Susan E. Hodges
(74) *Attorney, Agent, or Firm* — Venable LLP

(57) ABSTRACT

Provided is a depth image correction apparatus to correct depth information in a depth image, which acquires a depth image and correction information, and corrects the depth values of the depth image based on the correction information and generates a corrected depth image. The apparatus acquires, as the correction information, first confidence indicating reliability in the depth values, and second confidence indicating reliability in position in an in-plane direction vertical to the depth direction. The apparatus performs first correction processing of generating a first corrected depth image by correcting the depth image based on the first confidence and similarity of the depth values, and second correction processing of generating the corrected depth image by correcting the first corrected depth image based on the second confidence.

22 Claims, 12 Drawing Sheets

(51) Int. Cl.
*G01B 11/24* (2006.01)
*G01B 21/04* (2006.01)
*H04N 13/257* (2018.01)
*H04N 13/15* (2018.01)
*H04N 13/254* (2018.01)

(56) References Cited

U.S. PATENT DOCUMENTS

| | | |
|---|---|---|
| 9,123,117 B2* | 9/2015 | Ciurea .................. H04N 13/232 |
| 9,495,806 B2* | 11/2016 | Nguyen .................. G06T 5/002 |
| 2011/0050864 A1* | 3/2011 | Bond ...................... G06T 7/579 |
| | | 348/51 |
| 2013/0215107 A1* | 8/2013 | Kimura .................. G06T 15/00 |
| | | 345/419 |
| 2015/0116464 A1* | 4/2015 | Tanaka ................... G06T 5/002 |
| | | 348/49 |

* cited by examiner

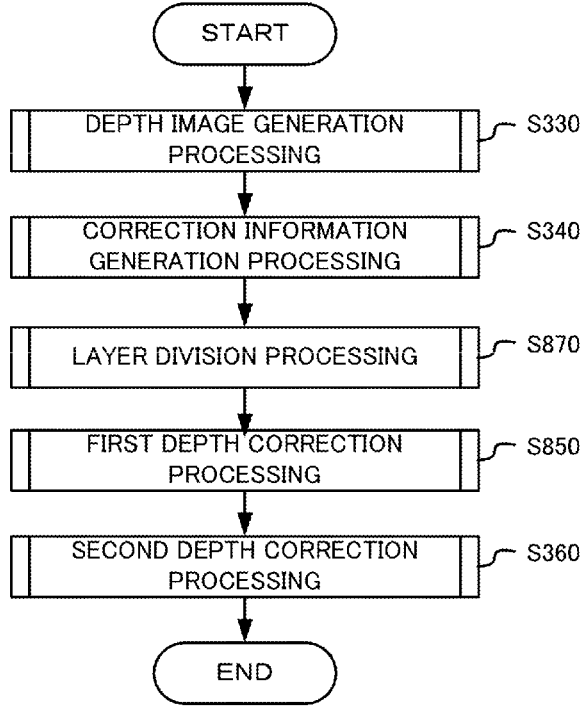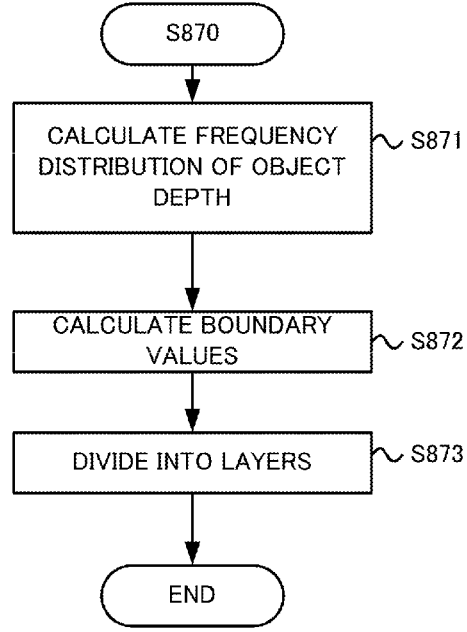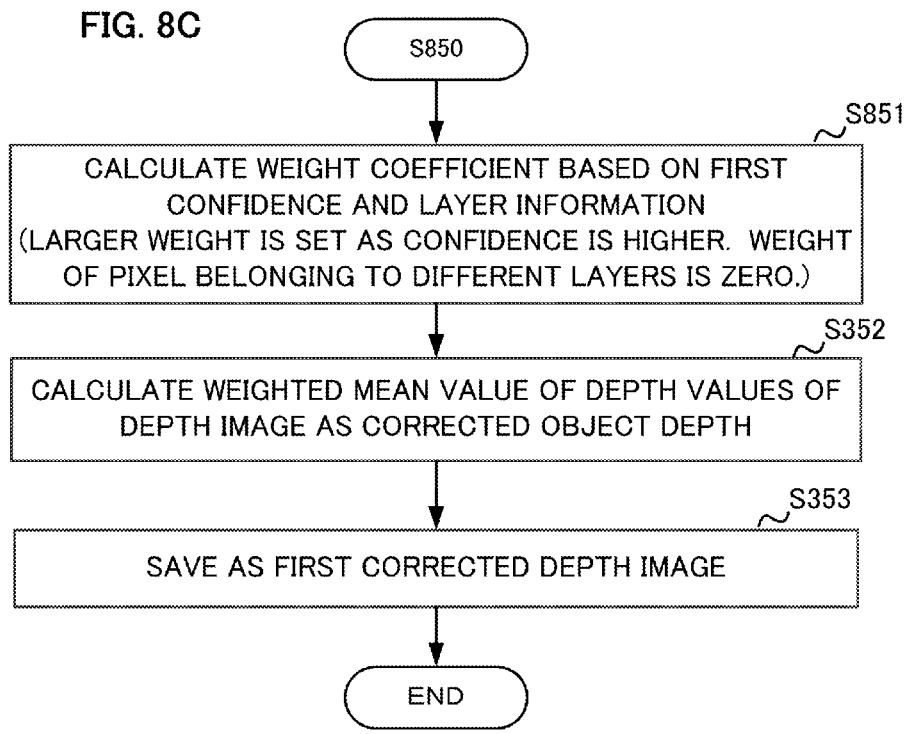

DEPTH IMAGING CORRECTION APPARATUS, IMAGING APPARATUS, AND DEPTH IMAGE CORRECTION METHOD

BACKGROUND OF THE INVENTION

Field of the Invention

The present invention relates to a depth image correction apparatus, and more particularly to a depth image correction apparatus used for a digital camera, a digital video camera and the like.

Description of the Related Art

For such imaging apparatuses as a digital still camera and a digital video camera, imaging apparatuses having a depth measurement function, which can acquire depth from the imaging apparatus to an object at a plurality of pixel positions (hereafter this depth is called an object depth; further, an image constituted from object depths acquired at a plurality of pixel positions is called a depth image) at the same time with acquiring an ornamental image have been proposed.

One depth measurement method that is known is an imaging plane phase difference depth measurement method. According to this method, an image pickup element that can acquire at least two image signals based on an image generated by luminous flux which passed through different pupil regions of an image forming optical system is used. The object depth can be acquired by detecting the relative positional shift amount (parallax) between the two image signals by a method similar to the parallax detection method using stereo images, and converting the detected parallax into a defocus amount using a predetermined conversion coefficient. Further, according to the imaging plane phase difference depth measurement method, an ornamental image signal can be generated by combining the two image signals.

Another known depth measurement method is the depth from defocus (DFD) method. In the case of the DFD method, two image signals are consecutively acquired while changing the photographing conditions (e.g. diaphragm value, focal length), and an object depth is acquired based on the difference of blur amounts between the two images. In the DFD method, one of the two image signals can be used for the ornamental image signal.

In both of the object depth calculation methods, the object depth is calculated based on the correlation between two image signals. A region-based matching method is normally used to evaluate this correlation. In the case of the region-based matching method, an image signal included in a predetermined collation region is extracted from each image signal, and correlation thereof is evaluated. If correlation of the two images can be accurately evaluated, the object depth can be acquired very accurately, otherwise an incorrect object depth may be calculated. Therefore methods for correcting an object depth of each pixel of a depth image have been proposed.

According to Non-Patent Document 1, a depth image is corrected by a weighted cross-bilateral filter using object depth, brightness information of the ornamental image, and information indicating confidence in the object depth.

According to Patent Document 1, a region of which object depth can be calculated is classified into a plurality of sub-regions in accordance with the object depth, and a region of which object depth cannot be calculated is interpolated with object depths of a peripheral area using similarity of the ornamental image signals.

Patent Document 1: Japanese Patent No. 5066851
Non-Patent Document 1: Matsuo Takuya, Norishige Fukushima, and Yutaka Ishibashi. "Weighted Joint Bilateral Filter with Slope Depth Compensation Filter for Depth Map Refinement." VISAPP (2). 2013.

SUMMARY OF THE INVENTION

Generally there are two types of causes of incorrect evaluation of correlation (incorrect evaluation of depth). One type of incorrect evaluation is generated due to the object or the photographing conditions. For example, if the contrast of the object does not change very much, or if the noise amount included in the image signal is high, incorrect evaluation of correlation may occur, and the value of the object depth may be incorrectly calculated. The second type of incorrect evaluation occurs when the collation region, which is used for evaluating correlation, has a relatively large region size. In the case when a plurality of objects having different depths are included in a collation region, the depth of one of the objects included in the collation region is calculated as the depth of the target pixel, however it is uncertain which position of the objects was used to calculate the depth of the target pixel. In other words, the object depth may be calculated based on an incorrect position in the depth direction and on the vertical plane.

In the methods disclosed in Non-Patent Document 1 and Patent Document 1, the target object depth is corrected using the object depth of a peripheral region based on the similarity of the image characteristics acquired from the ornamental image, without considering the factors which caused the incorrect evaluation of the correlation. If the object depth values are accurately calculated for most of the peripheral region, the target object depth can be accurately corrected without the influence of the factors which caused the incorrect evaluation of the correlation. However, if the confidence in the object depth of the peripheral region is low, or if the object depth of the peripheral region has not been calculated, a major correction error is generated because the factors that caused incorrect evaluation of the correlation are not considered. In such a case, the object depth correction processing lowers the accuracy of the depth image.

With the foregoing in view, it is an object of the present invention to accurately correct the depth image.

A first aspect of the present invention is a depth image correction apparatus to correct depth information in a depth image, having: an acquisition unit configured to acquire a depth image in which depth information to indicate depth the values of an object in a depth direction at a plurality of pixel positions is stored, and correction information to correct the depth image; and a correction unit configured to correct the depth values of the depth image based on the correction information and to generate a corrected depth image, wherein the acquisition unit is further configured to acquire, as the correction information, first confidence which indicates reliability in the depth values of the depth image, and second confidence which indicates reliability in position of the depth image in an in-plane direction vertical to the depth direction, and the correction unit is further configured to perform first correction processing to generate a first corrected depth image by correcting the depth image based on the first confidence and similarity of the depth values, and second correction processing to generate the corrected depth image by correcting the first corrected depth image based on the second confidence.

A second aspect of the present invention is a depth image correction method to correct depth information in a depth image, comprising: an acquisition step of acquiring a depth image in which depth information to represent depth values of an object in a depth direction at a plurality of pixel positions is stored, and correction information to correct the depth image; and a correction step of correcting the depth values of the depth image based on the correction information and generating a corrected depth image, wherein the acquisition step further includes a step of acquiring, as the correction information, first confidence which indicates reliability in the depth values of the depth image, and second confidence which indicates reliability in position of the depth image in an in-plane direction vertical to the depth direction, and the correction step further includes a step of performing first correction processing to generate a first corrected depth image by correcting the depth image based on the first confidence and similarity of the depth values, and second correction processing to generated the corrected depth image by correcting the first corrected depth image based on the second confidence.

According to the present invention, the object image signal can be accurately corrected by correcting the depth image in accordance with the factors that caused incorrect evaluation of the correlation.

Further features of the present invention will become apparent from the following description of exemplary embodiments with reference to the attached drawings.

BRIEF DESCRIPTION OF THE DRAWINGS

FIGS. 8A to 8C are flow charts depicting the processing performed by the depth image generation apparatus according to Embodiment 3.

DESCRIPTION OF THE EMBODIMENTS

Embodiment 1

Figure 1A:
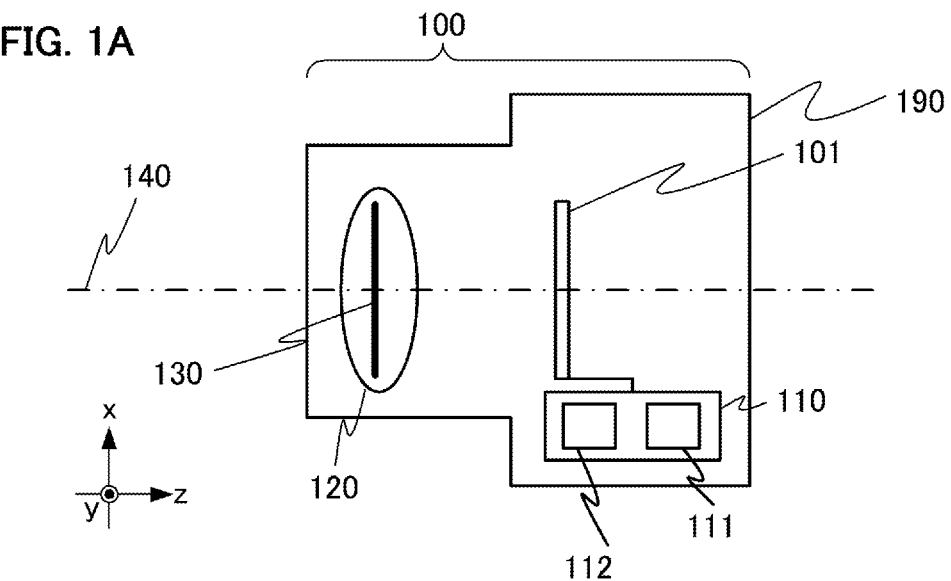
FIGS. 1A to 1C are drawings for describing an imaging apparatus that includes a depth image generation apparatus according to Embodiment 1.

Embodiment 1 of the present invention will be described with reference to the drawings. In the following description, a digital camera is used as an example of an imaging apparatus which includes a depth image generation apparatus (depth image processing apparatus) of the present invention, but application of the present invention is not limited to this.

In a description with reference to a drawing, a same reference sign denoted by a composing element indicates a same composing element even if the drawing number is different, and redundant description is minimized.

<Configuration of Digital Camera>

FIG. 1A is a digital camera 100 which includes a depth image generation apparatus 110 according to this embodiment. The digital camera 100 is constituted by an image forming optical system 120, an image pickup element 101, a depth image generation apparatus 110, an image generation unit (not illustrated), a lens driving control unit (not illustrated), and an image signal storage unit (not illustrated), which are disposed inside a camera housing 190. The depth image generation apparatus 110 can be constructed using logic circuits. As another format, the depth image generation apparatus 110 may be constituted by a central processing unit (CPU) and a memory storing a processing program.

The image forming optical system 120 is a photographing lens of the digital camera 100, which has a function to form an image of an object on the image pickup element 101. The image forming optical system 120 is constituted by a plurality of lens groups (not illustrated), and has an exit pupil 130 at a position distant from the image pickup element 101 by a predetermined distance. The reference sign 140 in FIG. 1A indicates an optical axis of the image forming optical system 120, and in this description, it is assumed that the optical axis is parallel with the z axis. It is also assumed that the x axis and the y axis are perpendicular to each other, and are perpendicular to the optical axis.

<Configuration of Image Pickup Element>

The image pickup element 101 is constituted by a complementary metal oxide semiconductor (CMOS) or a charge coupled device (CCD), and has a depth measurement function based on an imaging plane phase difference depth measurement method. An object image formed on the image pickup element 101 via the image forming optical system 120 is photoelectrically converted by the image pickup element 101, whereby a photographed image based on the object image is generated. An ornamental image can be generated by the image generation unit performing development processing on the acquired photographed image. The generated ornamental image can be stored in the image signal storage unit. The image pickup element 101 according to this embodiment will be described in detail with reference to FIG. 1B.

Figure 1B:
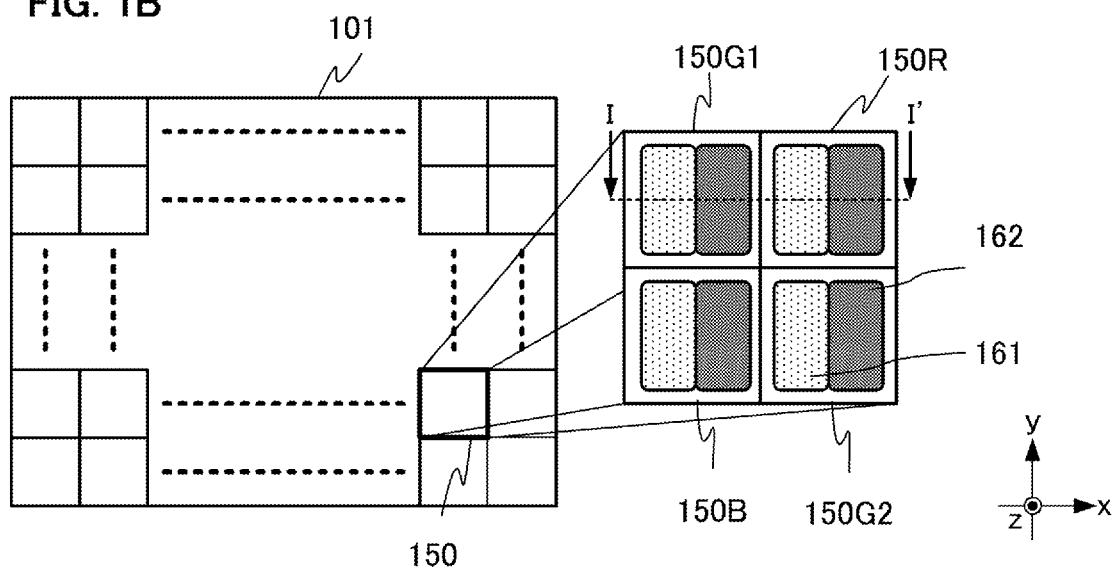

FIG. 1B is an xy cross-sectional view of the image pickup element 101. The image pickup element 101 is constituted by a plurality of pixel groups (2 rows×2 columns) 150 which are arrayed. The pixel group 150 is constituted by a green pixel 150G1 and a green pixel 150G2 which are disposed diagonally, and a red pixel 150R and a blue pixel 150B which are disposed in the other two pixel positions.

Figure 1C:
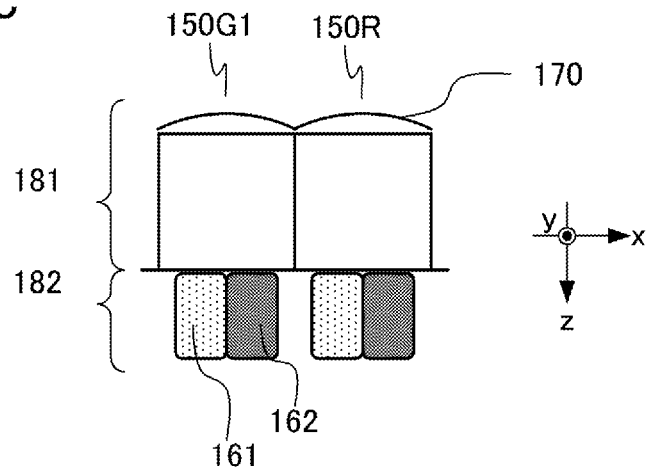

FIG. 1C is a schematic diagram of an I-I' cross-section of the pixel group 150. Each pixel is constituted by a light receiving layer 182 and a light guiding layer 181. Two photoelectric conversion units (first photoelectric conversion unit 161 and second photoelectric conversion unit 162), configured to photoelectrically convert the received light, are disposed in the light receiving layer 182. A micro-lens 170 for efficiently guiding a luminous flux which entered the pixel into the photoelectric conversion unit, a color filter (not illustrated) for allowing a light having a predetermined wavelength band to pass, wiring (not illustrated) for reading an image and driving the pixel and the like are disposed in the light guiding layer 181.

<Depth Measurement Principle of Imaging Plane Phase Difference Depth Measurement Method>

The luminous flux received by the first photoelectric conversion unit 161 and the second photoelectric conversion unit 162 of the image pickup element 101 of this embodiment will be described with reference to FIG. 2A.

Figure 2A:
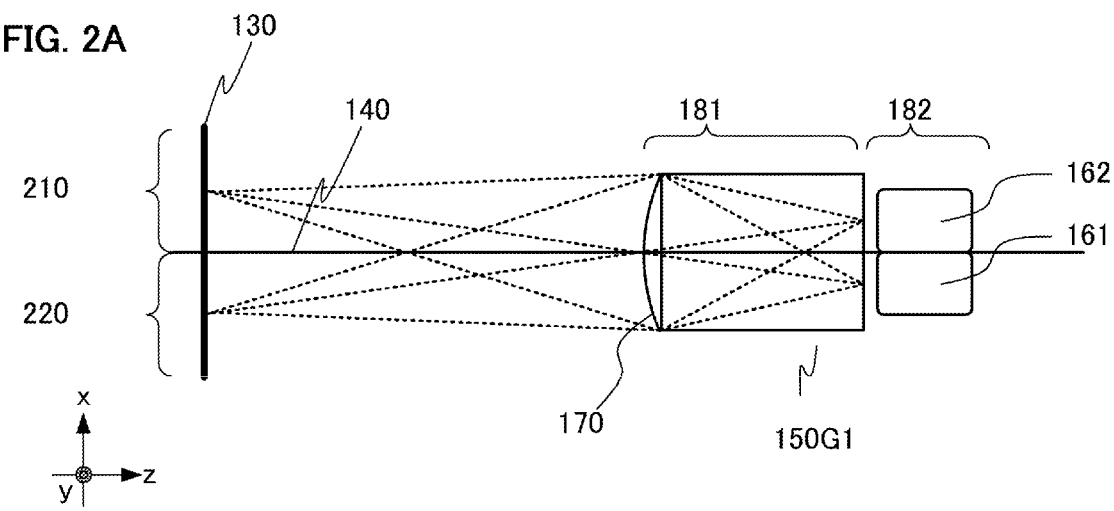
FIGS. 2A to 2D are drawings for describing the luminous flux received by the image pickup element in Embodiment 1, and the positional shift amount.

FIG. 2A is a schematic diagram depicting only the exit pupil 130 of the image forming optical system 120 and the green pixel 150G1 as a representative example of the pixels disposed in the image pickup element 101. The micro-lens 170 in the pixel 150G1, illustrated in FIG. 2A, is disposed so that the exit pupil 130 and the light receiving layer 182 are optically conjugate with each other. As a result, as illustrated in FIG. 2A, the luminous flux that passed through a first pupil region (210), which is a partial pupil region included in the exit pupil 130, enters the first photoelectric conversion unit 161. In the same manner, the luminous flux that passed through a second pupil region (220), which is a partial pupil region, enters the second photoelectric conversion unit 162.

A plurality of the first photoelectric conversion units 161, which are disposed in each pixel, photoelectrically convert the received luminous flux, and generate a first image signal. In the same manner, a plurality of the second photoelectric conversion units 162, which are disposed in each pixel, photoelectrically convert the received luminous flux, and generate a second image signal. The intensity distribution of the image formed on the image pickup element 101 by the luminous flux, which mainly passed through the first pupil region 210, can be acquired from the first image signal; and the intensity distribution of the image formed on the image pickup element 101 by the luminous flux, which mainly passed through the second pupil region 220, can be acquired from the second image signal.

Figure 2B:
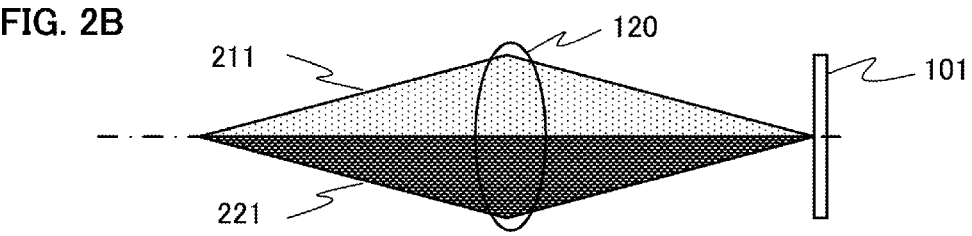
Figure 2C:
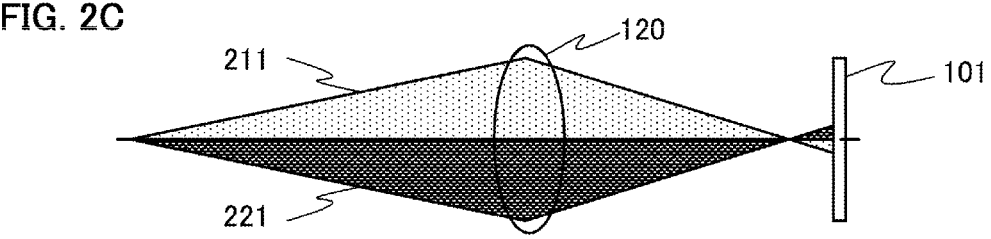
Figure 2D:
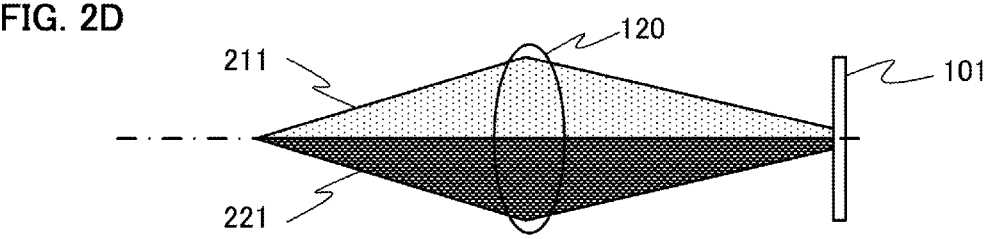

The relative positional shift amount between the first image signal and the second image signal is an amount in accordance with the defocus amount. The relationship between the positional shift amount and the defocus amount will be described with reference to FIGS. 2B, 2C and 2D. FIGS. 2B, 2C and 2D are schematic diagrams depicting the image pickup element 101 and the image forming optical system 120 of this embodiment. The reference sign 211 in the drawings indicates the first luminous flux which passes through the first pupil region 210, and the reference sign 221 indicates the second luminous flux which passes through the second pupil region 220.

FIG. 2B illustrates a focused state, where the first luminous flux 211 and the second luminous flux 221 converge on the image pickup element 101. In this case, the relative positional shift amount between the first image signal formed by the first luminous flux 211 and the second image signal formed by the second luminous flux 221 is 0. FIG. 2C indicates a defocused state on the image side in the negative direction of the z axis. In this case, the relative positional shift amount between the first image signal formed by the first luminous flux and the second image signal formed by the second luminous flux is not 0, but a negative value. FIG. 2D indicates a defocused state on the image side in the positive direction of the z axis. In this case, the relative positional shift amount between the first image signal formed by the first luminous flux and the second image signal formed by the second luminous flux is not 0, but a positive value.

As a comparison between FIG. 2C and FIG. 2D indicates, the direction of the positional shift switches depending on the positive/negative of the defocus amount. Further, a positional shift in accordance with the image forming relationship (geometric relationship) of the image forming optical system is generated in accordance with the defocus amount. Therefore if the positional shift amount between the first image signal and the second image signal is detected by the region-based matching method, which will be described later, the detected positional shift amount can be converted into the defocus amount using a predetermined conversion coefficient. The conversion from the defocus amount on the image side into the object depth on the object side can be easily performed using the image forming relationship of the image forming optical system 120. The conversion coefficient to convert the positional shift amount into the defocus amount can be determined using the dependency of the light receiving sensitivity of the pixel of the image pickup element 101 on the incident angle, the shape of the exit pupil 130, and the distance of the exit pupil 130 from the image pickup element 101.

<Description on Depth Image Generation Apparatus>

Figure 3A:
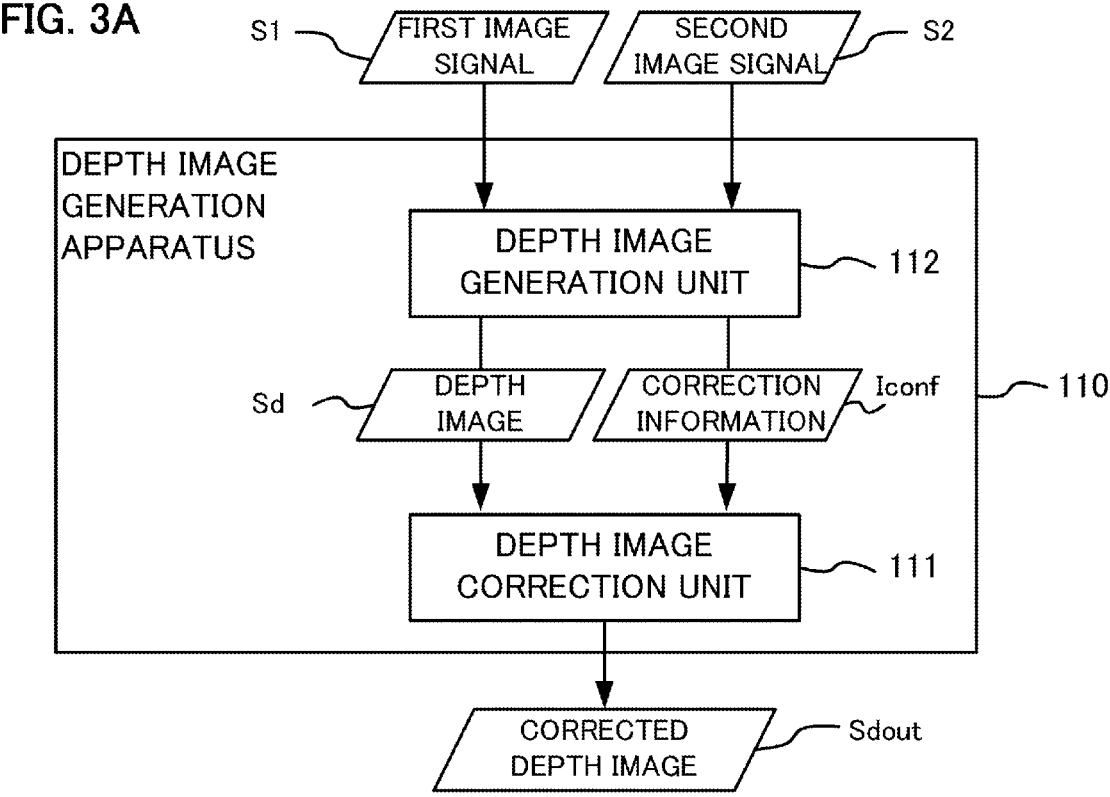
FIGS. 3A to 3C are drawings for describing the depth image generation apparatus according to Embodiment 1.
Figure 3B:
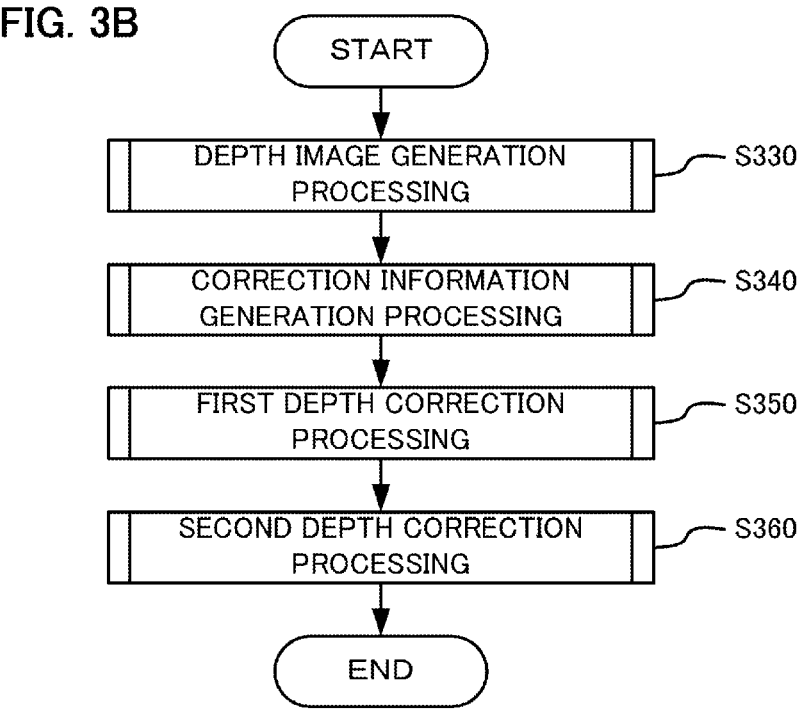
Figure 3C:
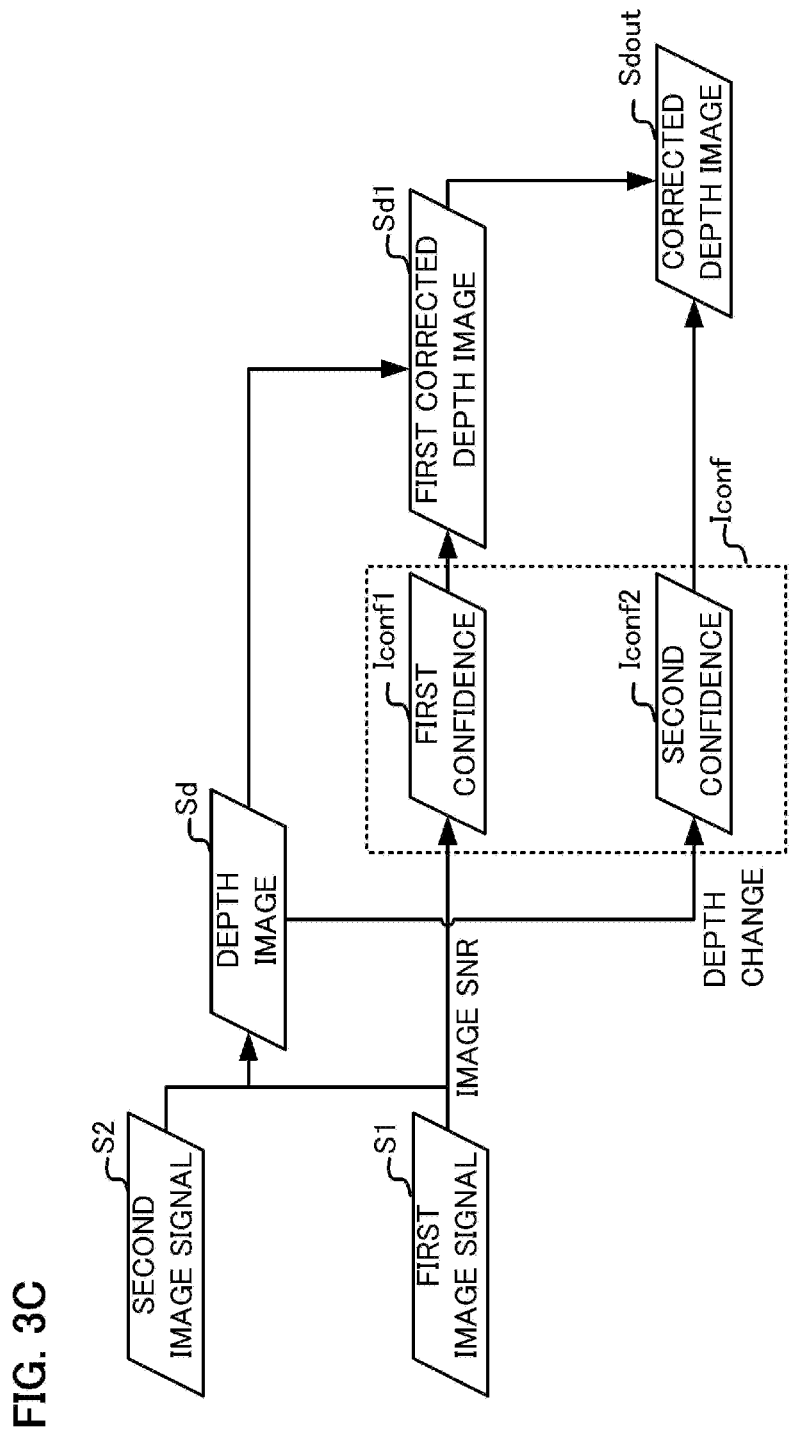

The depth image generation apparatus of this embodiment generates a depth image including the object depth information from a photographed image, and corrects the object depth information in the depth image. The depth image generation apparatus of this embodiment will be described with reference to the drawings. FIG. 3A is a block diagram depicting the general configuration of the depth image generation apparatus 110 of this embodiment. FIG. 3B is a flow chart depicting the operation of the depth image generation processing performed by the depth image generation apparatus 110. And FIG. 3C is a data flow chart in the depth image generation processing.

The depth image generation apparatus 110 is constituted by a depth image generation unit (acquisition unit) 112 and a depth image correction unit (correction unit) 111. The depth image generation unit 112 and the depth image correction unit 111 are also called a generation unit 112 and a correction unit 111 respectively.

The generation unit 112 generates a depth image Sd by calculating the object depth at a plurality of pixel positions in the depth image generation processing S330 based on the first image signal S1 and the second image signal S2, which are read from the image pickup element 101. The generation unit 112 also generates correction information Iconf by the correction information generation processing S340. The correction information Iconf of this embodiment includes two types of information. One is information indicating reliability in the value of the object depth (first confidence information Iconf1). The other is information indicating reliability in position of the object depth in an in-plane direction vertical to the depth direction (in-plane position of the object depth) (second confidence information Iconf2).

The correction unit 111 generates a corrected depth image Sdout by acquiring the depth image Sd and the correction information Iconf from the generation unit 112, and performing the correction processing on the object depth (S350 and S360). In this embodiment, a first corrected depth image Sd1 is generated by correcting the depth image Sd based on the first confidence Iconf1. Then corrected depth image Sdout is generated and outputted by correcting the corrected depth image Sd1 based on the second confidence Iconf2. The processing content of the depth image generation apparatus 110 will be described in detail.

Figure 4A:
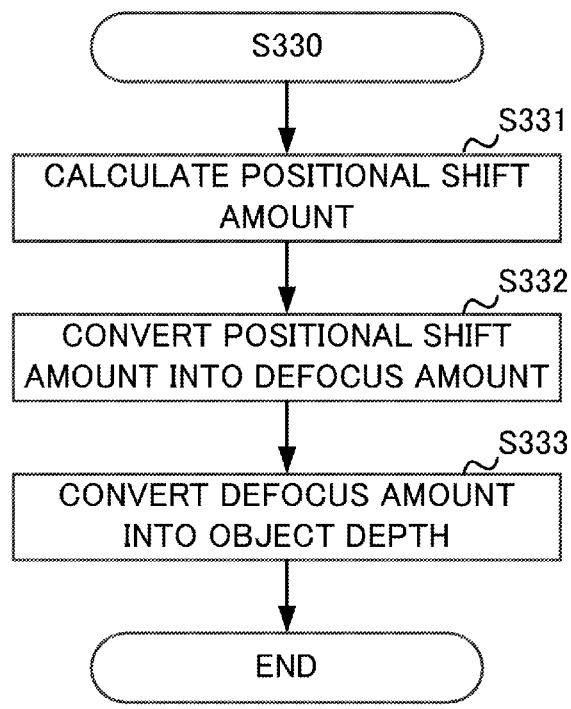
FIGS. 4A to 4D are flow charts depicting the processing performed by the depth image generation apparatus according to Embodiment 1.

Concrete processing content of the depth image generation processing S330 will be described with reference to FIG. 4A. In step S331, the generation unit 112 calculates a relative positional shift amount between a first image signal S1 and a second image signal S2. In concrete terms, the positional shift amount is calculated according to the following procedure. First a target point (target pixel) is set in the first image signal S1, and a collation region is set centering around the target point. Then a reference point is set in the second image signal S2 at a position corresponding to the target point, and a reference region is set centering around the reference point. The generation unit 112 calculates the correlation between the first image signal S1 included in the collation region and the second image signal S2 included in the reference region while sequentially moving the reference point, and regards the reference point having the highest correlation as a corresponding point (corresponding pixel) which corresponds to the target point. The generation unit 112 determines the relative positional shift amount between the target point and the corresponding point as the positional shift amount at the target point. By calculating the positional shift amount while sequentially moving the target point, the positional shift amount at a plurality of pixel positions can be calculated. A known method can be used to calculate the correlation, such as the normalized cross-correlation (NCC) method, which evaluates the normalized cross-correlation between image signals.

In step S332, the generation unit 112 converts the positional shift amount into the defocus amount, which is a distance from the image pickup element 101 to the focal point of the image forming optical system 120, using a predetermined conversion coefficient. When Gain denotes the predetermined conversion coefficient, $\Delta L$ denotes the defocus amount, and d denotes the positional shift amount, the positional shift amount d can be converted into the defocus amount $\Delta L$ using the following Expression (1).

$$\Delta L = \text{Gain} \times d \quad (1)$$

In step S333, the generation unit 112 converts the defocus amount into the object depth. As mentioned above, the defocus amount can be converted into the object depth using the image forming relationship of the image forming optical system 120. By performing the processing in FIG. 4A at a plurality of pixel positions, a depth image constituted from the object depth at each pixel position can be generated.

Figure 4B:
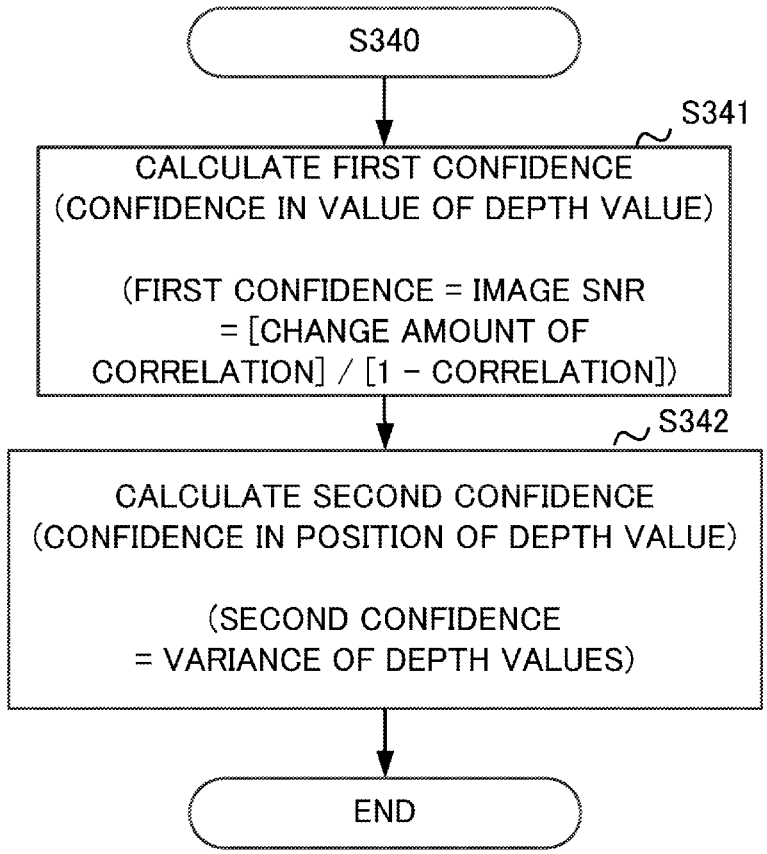

Concrete processing content in the correction information generation processing S340 will be described with reference to FIG. 4B. The correction information generation processing S340 includes processing to determine first confidence Iconf1, which indicates the reliability in the value of the depth (S341), and processing to determine second confidence Iconf2 which indicates the reliability in the position of the depth (S342).

The first confidence Iconf1 is information which represents the reliability in the value of the object depth, as mentioned above. When the contrast of the object does not change very much, or when the amount of noise included in the first image signal S1 or second image signal S2 is high, that is, when the image SN ratio of the image signal is low, the depth value often becomes incorrect. Therefore in this embodiment, the first confidence Iconf1 is calculated as a value in accordance with the image SN ratio of the image signal.

The image SN ratio is a value in accordance with the ratio of the noise amount included in the image signal to the magnitude of the contrast change. Therefore the generation unit 112 acquires a value to be an index which indicates the noise amount included in the image signal, and a value to be an index which indicates the magnitude of the contrast change.

As the index which indicates the noise amount, the correlation acquired when the corresponding point is calculated in step S331 can be used. If the correlation between the target point and the corresponding point is low, the probability of incorrectly evaluating the correlation, due to the influence of noise included in the image signal and the like, is high. In other words, the correlation between the target point and the corresponding point becomes an index which indicates the noise amount included in the image signal.

For the value to be an index which indicates the magnitude of the contrast change, a change amount between the correlation at the corresponding point and the correlation in the vicinity of the corresponding point, when the corresponding point was calculated in step S331, can be used. The correlation in the vicinity of the corresponding point may be a correlation in a pixel adjacent to the corresponding point, or may be a correlation in a pixel which is distant from the corresponding point by a predetermined number of pixels, or may be an average of correlations in a plurality of pixels in the vicinity of the corresponding point. When the contrast of the object does not change very much, the change amount of the correlation is small. In other words, probability of incorrectly evaluating the correlation is also high when the change amount of the correlation is small. Therefore the change amount of correlation becomes an index which indicates the contrast change.

The generation unit 112 calculates the ratio of the contrast change to the noise amount (that is, the image SN ratio) as the first confidence Iconf1. As the contrast change is larger, the change amount of correlation is larger. Further, as the noise amount is larger, correlation at the corresponding point is smaller. Therefore the generation unit 112 generates the first confidence Iconf1 so as to be larger as the change amount of the correlation is larger, and smaller as the correlation in the corresponding point is larger. For example, the first confidence Iconf1 is calculated as (change amount of correlation)/(1−correlation in corresponding point).

The second confidence Iconf2 is information which indicates the reliability in the position of the object depth, as mentioned above. The position of the object depth is calculated incorrectly when a plurality of objects having different object depth values are included in the collation region which was used for calculating the positional shift amount in step S331. In such a case, a depth value of a peripheral pixel of the target pixel may be calculated as the depth value of the target pixel. Therefore in this embodiment, the second confidence Iconf2 is calculated as a value in accordance with the magnitude of the depth change in the collation region.

In step S342, the generation unit 112 calculates a variance of the depth values in the depth image Sd as the second confidence Iconf2. In concrete terms, the generation unit 112 sets a reference region centering around the confidence calculation pixel of the depth image Sd, and calculates the variance of the depth image Sd included in the reference region as the second confidence Iconf2 of the confidence calculation target pixel. In this embodiment, the size and shape of the reference region is the same as the collation region to calculate the positional shift amount of the depth image generation processing S330, but the size and shape may be different from the collation region. For example, in the case of performing the bandpass filter processing on the first image signal S1 and the second image signal S2 in the depth image generation processing S330, the size and shape of the reference region may be determined considering the collation region and the filter size of the bandpass filter.

In a region where a plurality of objects having different object depth values are included in the collation region which was used for calculating the positional shift amount in step S331, the depth of any one of the objects included in the collation region is calculated. Therefore in a region in which reliability in the object depth at the in-plane position is low, the depth change in the depth image Sd becomes large. The variance of the depth image Sd calculated in step S342 has a larger value as the depth change in the reference region is larger, hence a region of which variance is large can be regarded as a region of which the reliability in the object depth at the in-plane position is low. Therefore in this embodiment, the reliability in the object depth at the in-plane position is lower as the value of the second confidence Iconf2 is larger.

In a region of which the depth change of the depth image Sd is large, a region, of which the reliability in the object depth at the in-plane position is low, is included. In this embodiment, the depth change of the depth image Sd is evaluated using the variance of the depth image Sd included in the reference region, but the depth change may be evaluated using other methods. For example, the magnitude of the depth change of the depth image Sd may be evaluated using a difference between the maximum value and the minimum value of the depth image Sd included in the reference region, or an absolute sum of the values acquired in the reference region, by performing processing using a differential filter, such as a Laplacian filter, on the depth image Sd. Further, assuming that the depth values of the depth image Sd were corrected, the magnitude of the depth change of the depth image Sd may be evaluated using the change of the object depth values before and after the correction. For a region in which the depth change before and after the correction is large, it can be determined that the reliability in the object depth at the in-plane position is low. This correction processing is used to evaluate the magnitude of the depth change, and does not require actual correction of the depth image Sd. For example, this correction processing is weighted mean processing using weight coefficients in accordance with the similarity of the image characteristics (e.g. brightness, color) with the correction target pixel or the reliability in the depth values.

The correction unit 111 corrects the depth image Sd and generates the corrected depth image Sdout via the first depth correction processing S350 and the second depth correction processing S360.

Figure 4C:
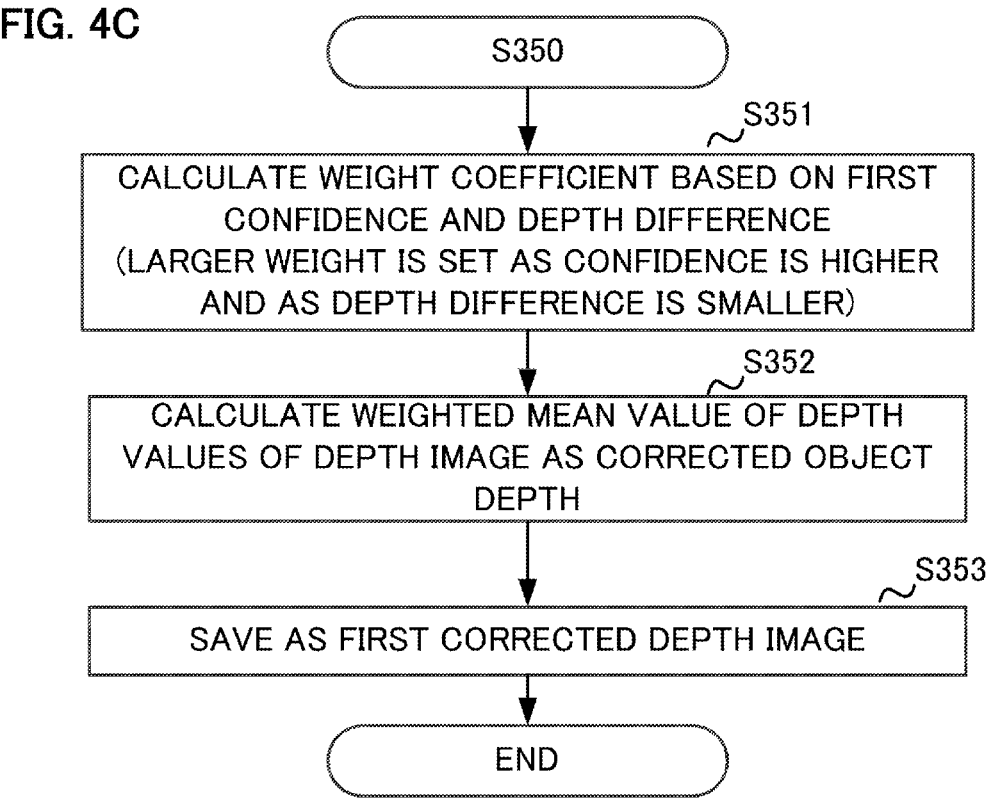

Concrete processing content of the first depth correction processing S350 will be described with reference to FIG. 4C. In step S351, the correction unit 111 calculates weight coefficients, which are used for correction of the object depth, using the first confidence Iconf1 included in the correction information Iconf. As described later, in the first depth correction processing, the weighted mean value of the depth values of the peripheral pixels of the corrected target pixel is regarded as the corrected depth value. In step S351, the weight coefficients used for this weighted mean processing are calculated. In concrete terms, the correction unit 111 sets the reference region centering around the target point (correction target pixel) of the depth image Sd, and sets the weight coefficient of each pixel included in the reference region. The weight coefficient of each pixel is set so that a larger value is set as the reliability, indicated by the first confidence Iconf1 is higher and the depth value of the pixel, is closer to the depth value of the target point. In other words, the weight coefficients are set for the neighboring region of the target pixel so that contribution to the corrected depth value is higher as the reliability indicated by the first confidence Iconf1 is higher, and as the object depth in the region has a higher similarity to the target point.

In step S352, the correction unit 111 calculates the weighted mean value of the object depth values included in the reference region using the weight coefficients, and regards the result as the corrected depth of the target point. In the first depth correction processing S350, the corrected depth is calculated at each pixel while sequentially shifting the target point, whereby the first corrected depth image Sd1, where each pixel value is constituted by the corrected depth value, is generated. In step S353, the correction unit 111 saves the generated first corrected depth image Sd1 in memory.

In the first depth correction processing S350, the corrected object depth is calculated by weighted mean processing using the first confidence Iconf1 which indicates the reliability in the value of the object depth and the similarity of the object depth to the depth of the target point. Therefore in the first depth correction processing S350, the first corrected depth image, which is a high precision depth image in which depth dispersion is further reduced, is generated by further increasing the contribution of the object depth values in the pixel positions having high confidence in the depth image Sd. Moreover, a major depth change before and after the correction is suppressed by using the depth difference from the target point when the weight coefficient is calculated, whereby correction errors, when the first confidence Iconf1 in the peripheral region of the target point is low, are reduced.

Figure 4D:
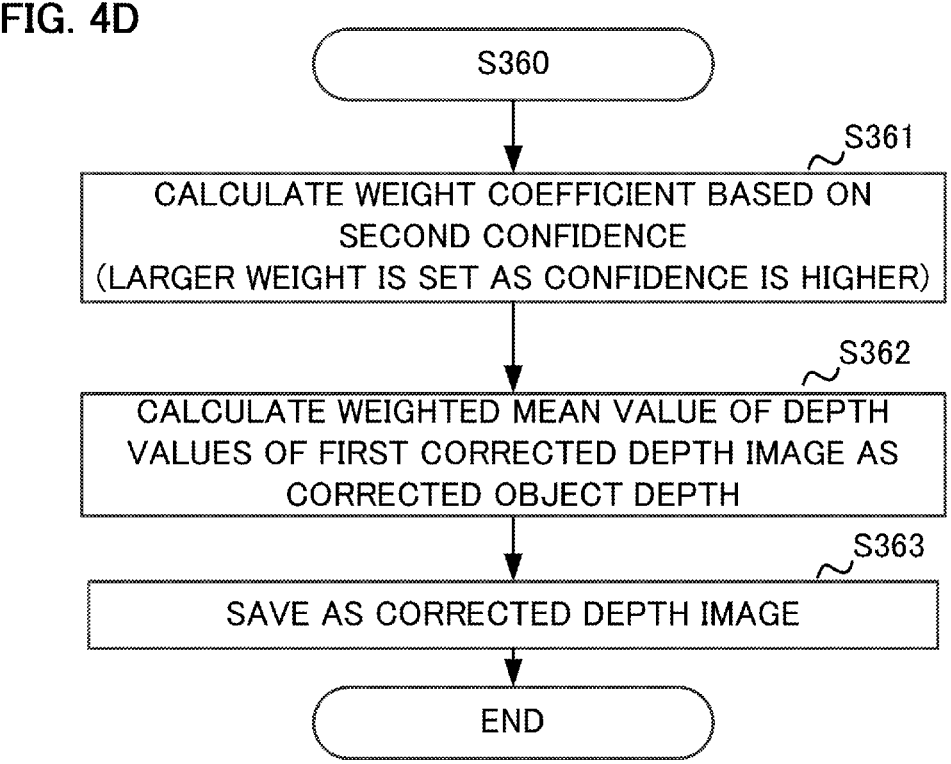

Concrete processing content of the second depth correction processing S360 will be described with reference to FIG. 4D. In step S361, the correction unit 111 calculates the weight coefficients which are used for correction of the object depth. The target point and the reference region are set in the first corrected depth image using the same method as step S351, and the weight coefficients are set so that the value becomes larger as the second confidence Iconf2 is higher. In other words, the weight coefficients are set for the neighboring region of the target pixel so that contribution to the corrected depth value becomes higher as the second confidence Iconf2 is higher. In step S362, the weighted mean value of the object depth values constituting the first corrected depth image Sd1 included in the reference region is calculated using the weight coefficients, and the result is regarded as the corrected depth of the target point. In the second depth correction processing S360, the corrected depth is calculated for each pixel while sequentially shifting the target point, whereby the corrected depth image Sdout, where each pixel value is constituted by the corrected depth value, is generated. In step S363, the correction unit 111 saves the generated corrected depth image Sdout in memory, or outputs the corrected depth image Sdout to an external apparatus.

In the second depth correction processing S360, the second confidence Iconf2, which indicates the reliability in the object depth at the in-plane position, is calculated based on the first corrected depth image Sd1, and the corrected object depth is calculated by weighted mean processing using this second confidence Iconf2. Therefore the corrected depth image Sdout, which is a high precision depth image in which an error of the object depth at the in-plane position is further reduced, can be generated.

The region where an error of the object depth at the in-plane position is large becomes mainly a region in which the depth change in the depth image is large, and becomes a relatively limited region. On the other hand, the region where an error of the value of the object depth is large is more likely to have a larger surface area, because the error is caused by the contrast change of the object and the photographing conditions. In the depth image correction unit 111 of this embodiment, the depth image is corrected in the first depth correction processing, while reducing correction errors due to depth values having low first confidence in the peripheral region of the target point. Then in the second depth correction processing, an error of the object depth at the in-plane position is reduced, while allowing a major depth change. By performing the second depth correction processing after the first depth correction processing, the correction error, which is generated when reliability is low in either the value or in-plane position of the object depth, can be reduced for the peripheral region of the target point, and the depth image can be more accurately corrected. In other words, a more accurate corrected depth image with less correction error can be generated by separating the depth correction steps in accordance with the factors which caused incorrect evaluation of the correlation.

<Other Examples of First Confidence Information Generation Processing S341>

Figure 5A:
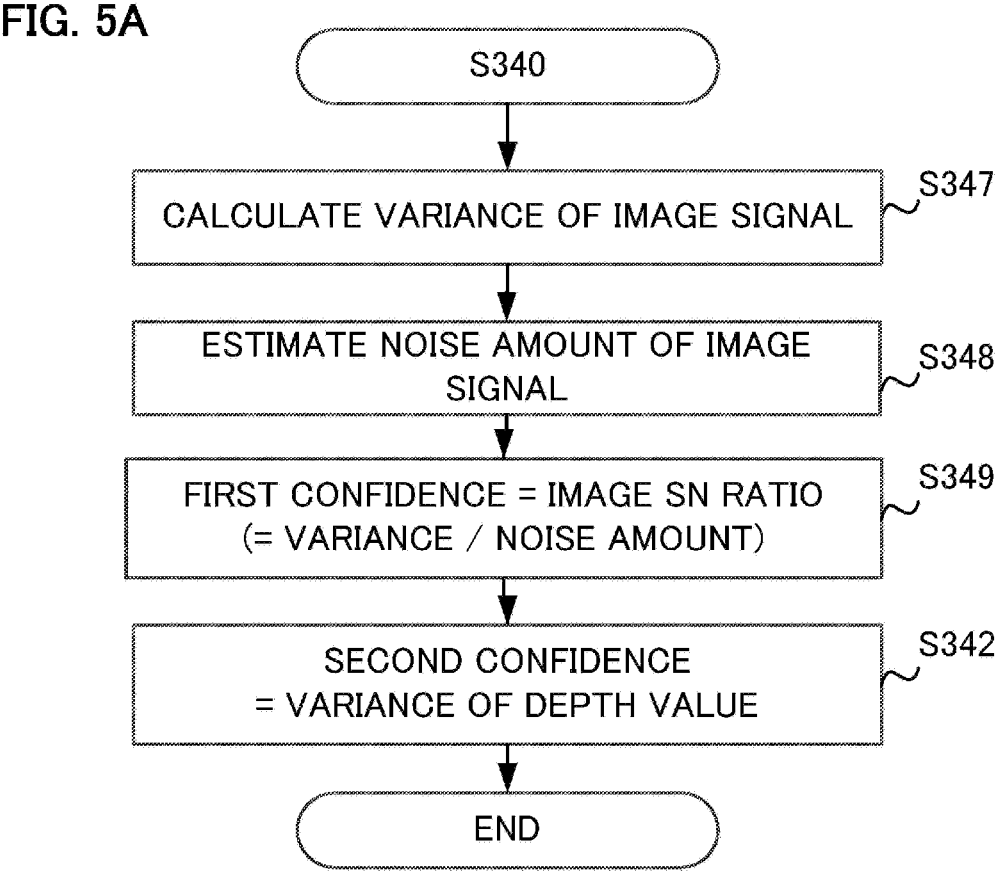
FIGS. 5A and 5B are drawings for describing confidence information generation processing according to a modification of Embodiment 1.

In the first confidence information generation processing S341 of this embodiment, to calculate the image SN ratio, the noise amount included in the image signal is evaluated using the correlation at the corresponding point as an index, and the contrast change of the object is evaluated using the change amount of the correlation as an index. Instead of the above mentioned method, the magnitude of the contrast change and the noise amount may be calculated from at least one of the first image signal S1 and the second image signal S2. Another method for calculating the image SN ratio will be described next with reference to FIG. 5A. The processing in steps S347 to S349 in FIG. 5A is a modification of the first confidence calculation processing. In step S347, the generation unit 112 calculates the variance of the first image signal S1 included in the collation region. As the variance is larger, the contrast change of the first image signal S1 included in the collation region increases. In step S348, the generation unit 112 estimates the noise amount included in the image signal from the pixel value of the first image signal S1 included in the collation region. The noise amount included in the image signal can be estimated by: noise amount=noise estimation coefficient×pixel value×ISO sensitivity. This is because an expected value of the optical shot noise amount generated in photoelectric conversion is in proportion to the square root of the number of photons. Since the noise amount estimation coefficient depends on the pixel structure in the image pickup element 101, the noise characteristic of the image pickup element 101 is measured in advance and used. For the ISO sensitivity, the ISO sensitivity, which was used for photographing by the digital camera 100, is used. In step S349, the generation unit 112 calculates the first confidence Iconf1 based on the variance determined in step S347 and the ratio of the noise amount determined in step S348.

Other factors that cause a calculation error of the object depth value are: brightness saturation in which pixel values saturate during photographing; and cyclic object in which the contrast change of the object occurs cyclically. Therefore in order to more accurately evaluate the reliability in the value of the object depth by the generation unit 112, it is desirable to use one or both of the brightness saturation and the contrast change cyclicity of the object, in addition to the image SN ratio.

The brightness saturation can be calculated as a ratio of a region, in which at least one of the first image signal S1 and the second image signal S2 is saturated in brightness, for the collation region used for calculating the positional shift amount, in the depth image generation processing S330.

Figure 5B:
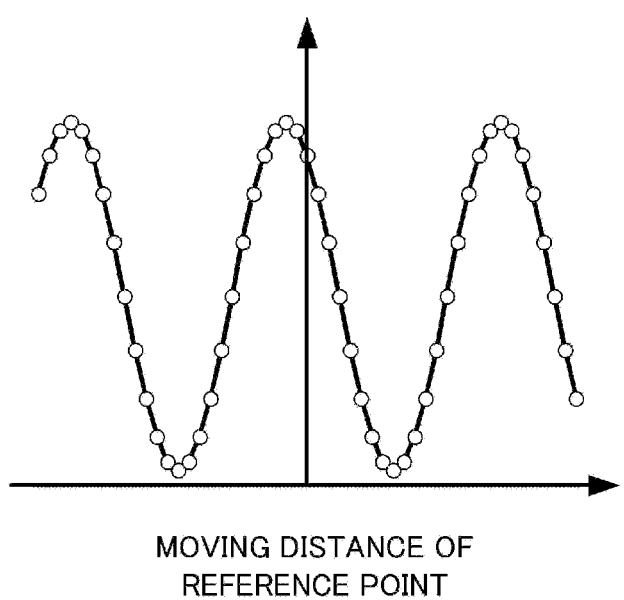

The cyclicity of the object can be evaluated based on the correlation change pattern when the reference point is moved. FIG. 5B is a diagram depicting the relationship of the correlation and the moving distance of the reference point in the case of photographing a cyclic object. In the case of photographing a cyclic object, the correlation has a maximum value cyclically since the contrast change is converted cyclically. Therefore it can be determined whether the object is a cyclic object or not by evaluating whether the moving distance of the reference point, in which the correlation is the maximum value, is cyclic.

In the first depth correction processing S350, the result determined about the brightness saturation and the object cyclicity can be used in addition to the image SN ratio as the first confidence Iconf1. In other words, the correction error included in the correction depth image can be further reduced since contribution of the region, in which object depth value is more accurately calculated, to determining the corrected object depth, can be increased. Depending on the object or photographing conditions, it is unnecessary to use all of the image SN ratio, the brightness saturation and the object cyclicity, and the first confidence Iconf1 may be calculated using at least one of these three.

<Other Examples of Depth Image Correction Unit 111>

The correction information of this embodiment includes the first confidence Iconf1 and the second confidence Iconf2, but may include image characteristics calculated from at least one of the first image signal S1 and the second image signal S2. In other words, in at least one of step S351 in FIG. 4C and step S361 in FIG. 4D, the weight coefficients may be calculated by further considering the similarity of image characteristics. In concrete terms, for the pixels around the target point (correction target pixel), a larger value of the weight coefficient is set for a pixel as the pixel has higher similarity with the image characteristics of the correction target pixel. Thereby contribution of an object that is different from the object including the target point can be further reduced when the corrected object depth is calculated, and the object depth can be corrected more accurately. For the image characteristics, brightness, color or statistical amount (such texture information as standard deviation or root-mean-square of image signals in the vicinity of the target point) can be used. The similarity of the image characteristics can be calculated based on the brightness difference or color difference (difference of colors in a certain color space) from the target point, or the difference of the statistical amount from the target point.

In this embodiment, the first depth correction processing S350 and the second depth correction processing S360 were described based on the assumption that the first confidence Iconf1 and the second confidence Iconf2 included in the correction information are multi-valued information. However, at least one of the first confidence and the second confidence may be binary information using a predetermined threshold. Further, in step S351 in the first depth correction processing S350, the weight coefficient may be binary information determining the depth difference using a predetermined threshold. By binarizing the weight coefficient, the computing amount related to correction of the depth image can be reduced, and the corrected depth image can be generated at higher speed.

In this embodiment, in the first depth correction processing S350 and the second depth correction processing S360, the object depth is corrected while sequentially moving the target point, but the object depth need not be corrected for all the pixels. By the first depth correction processing, accuracy of the depth values improves in a region where both the first confidence and the second confidence are high and in a region where the first confidence is low, but accuracy of the depth values does not improve much in a region where the first confidence is high and the second confidence is low. Considering this aspect, the target points may be set only in a region where both the first confidence and the second confidence are high and the region where the first confidence is low, in the first depth correction processing S350. Further, considering that the accuracy of the depth values in a region where the second confidence is low largely improves in the second depth correction processing S360, the target points may be set only in a region where the second confidence is low in the second depth correction processing S360. In either case, the high/low of confidence may be determined based on comparison with a predetermined threshold. In the first depth correction processing and the second depth correction processing, the computing amount related to the correction of the depth image can be reduced and the corrected depth image can be generated at higher speed if the region in which the object depth is corrected is limited.

<Other Examples of Depth Calculation Method>

Figure 6A:
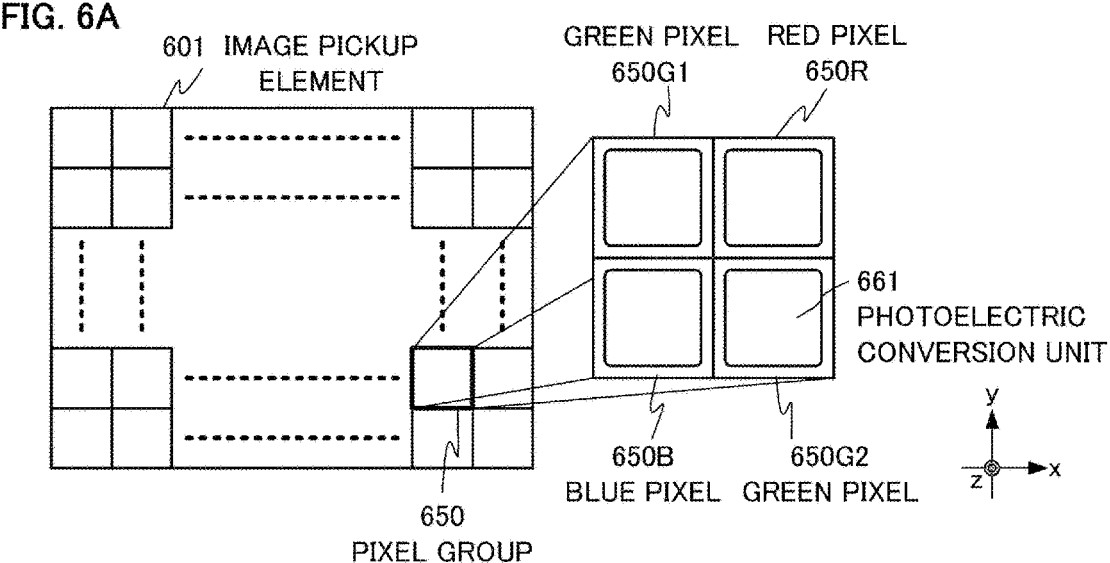
FIGS. 6A to 6D are drawings for describing a modification of the image pickup element and the depth calculation method.

In the digital camera 100 of this embodiment, the object depth is calculated by the imaging plane phase difference depth measurement method using the image pickup element 101, in which two photoelectric conversion units are disposed in one pixel, but the object depth may be calculated based on other depth measurement principles. In the digital camera 100 of this embodiment, the object depth may be calculated using the first image signal and the second image signal which were photographed using an image pickup element 601 of which xy cross-section is depicted in FIG. 6A, while changing the photographing conditions. In this modification, the depth image generation unit 112 in FIG. 3A generates the depth image Sd with the processing content which will be described later with reference to FIG. 6D.

The image pickup element 601 in FIG. 6A is constituted by a plurality of pixel groups (2 rows×2 columns) 650 which are arrayed. The pixel group 650 is constituted by a green pixel 650G1 and a green pixel 650G2 which are disposed diagonally, and a red pixel 650R and a blue pixel 650B which are disposed at the other two pixel positions. Only one photoelectric conversion unit 661 is disposed in each pixel.

Figure 6B:
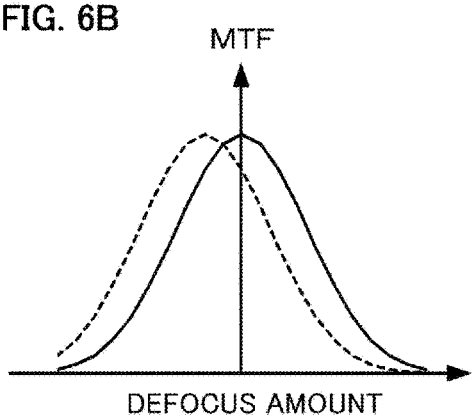
Figure 6C:
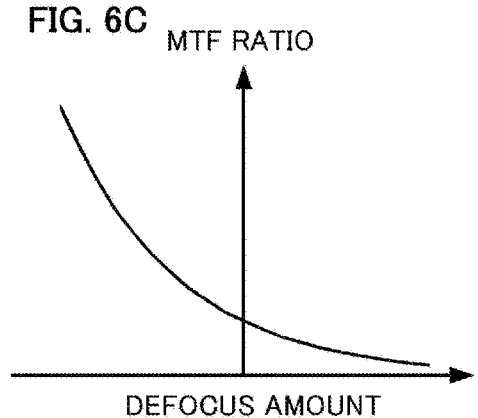

In FIG. 6B, the modulation transfer function (MTF) under the first imaging condition is indicated by a solid line, and the MTF under the second imaging condition is indicated by a broken line, where the focusing position is changed as an imaging condition. The abscissa indicates the defocus amount, and the ordinate indicates the MTF. By photographing consecutively while changing the focusing position, images can be photographed while changing the dependency of the MTF on the defocus amount under the first imaging condition and the second imaging condition. FIG. 6C depicts the relationship of the defocus amount and the ratio of the MTF under the first imaging condition and the MTF under the second imaging condition. The change of the MTF ratio depending on the defocus amount is depicted. In the DFD method, correlation between the first image signal photographed under the first imaging condition and the second image signal photographed under the second imaging condition is evaluated, whereby the difference of MTFs (that is, the difference of blur amounts) is calculated, and the defocus amount is detected. The detected defocus amount is converted into object depth based on the image forming relationship of the image forming optical system 120, whereby the object depth can be calculated, just like the above mentioned imaging plane phase difference depth measurement method.

Figure 6D:
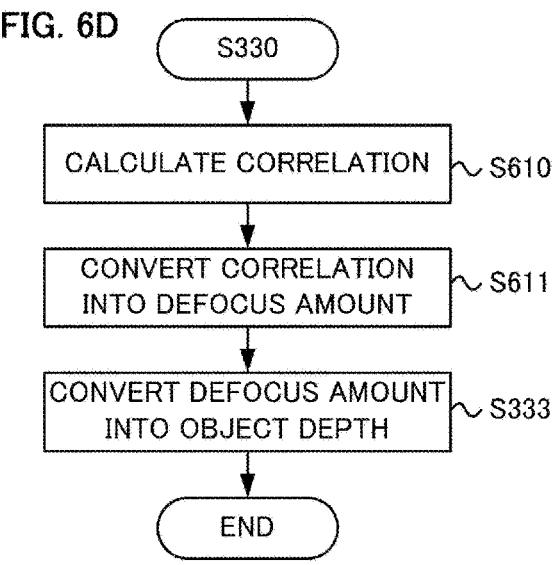

FIG. 6D is a flow chart depicting the processing content of the depth image generation processing S330 by the depth image generation unit 112. In step S610, the correlation between the first image signal and the second image signal is calculated. In other words, a target point is set in the first image signal, and a collation region centering around the target point is set. Then a reference point is set in the second image signal at a position corresponding to the target point, and a reference region centering around the reference point is set. Then correlation between the first image signal included in the collation region and the second image signal included in the reference region is calculated. In step S611, the processing to convert the correlation into the defocus amount is performed. To convert the correlation into the defocus amount, a lookup table, which indicates correspondences, is stored in memory (not illustrated) of the digital camera 100 in advance, and this lookup table is used for reference. For example, when the correlation is high (when correlation is close to 1 if the NCC method is used for correlation), it is assumed that the blur amount of the first image signal is roughly the same as that of the second image signal, hence the defocus amount is indicated by the intersection of the solid line and broken line in FIG. 6B. In step S333, the processing to convert the defocus amount into the object depth is performed in the same manner as FIG. 4A.

The first confidence Iconf1 is for evaluating the image SN ratio, and may be calculated by a method that is different from this embodiment. For example, the first confidence Iconf1 may be determined by the above mentioned processing in FIG. 5A. Depending on the object and the photographing conditions, the brightness saturation in addition to the image SN ratio may be used for the first confidence Iconf1, or only the brightness saturation may be used for the first confidence Iconf1 without using the image SN ratio. The second confidence Iconf2 is for evaluating the boundary portion of the depth image. Instead of using the variance of depth values in the peripheral region, the second confidence Iconf2 may be calculated using the difference between the maximum value and the minimum value of the depth values in the peripheral region, the edge extraction result in the depth image or the virtual magnitude of the depth change before and after the correction processing based on the similarity of brightness.

Even in the case of using the DFD method as the object depth calculation method, a more accurate corrected depth image with less correction error can be generated by the depth image correction unit 111 of this embodiment, separating the depth correction processing according to the factors which caused incorrect evaluation of the correlation.

Embodiment 2

Figure 7A:
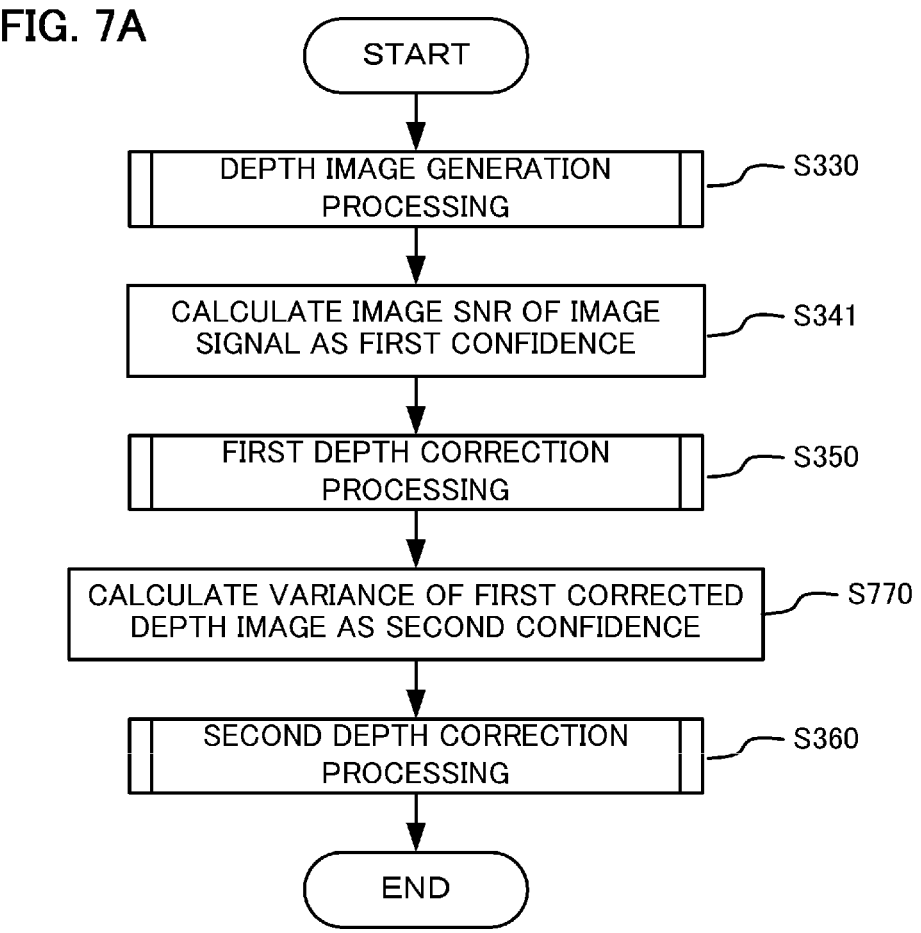
FIGS. 7A and 7B are flow charts depicting the processing performed in the depth image generation processing according to Embodiment 2.
Figure 7B:
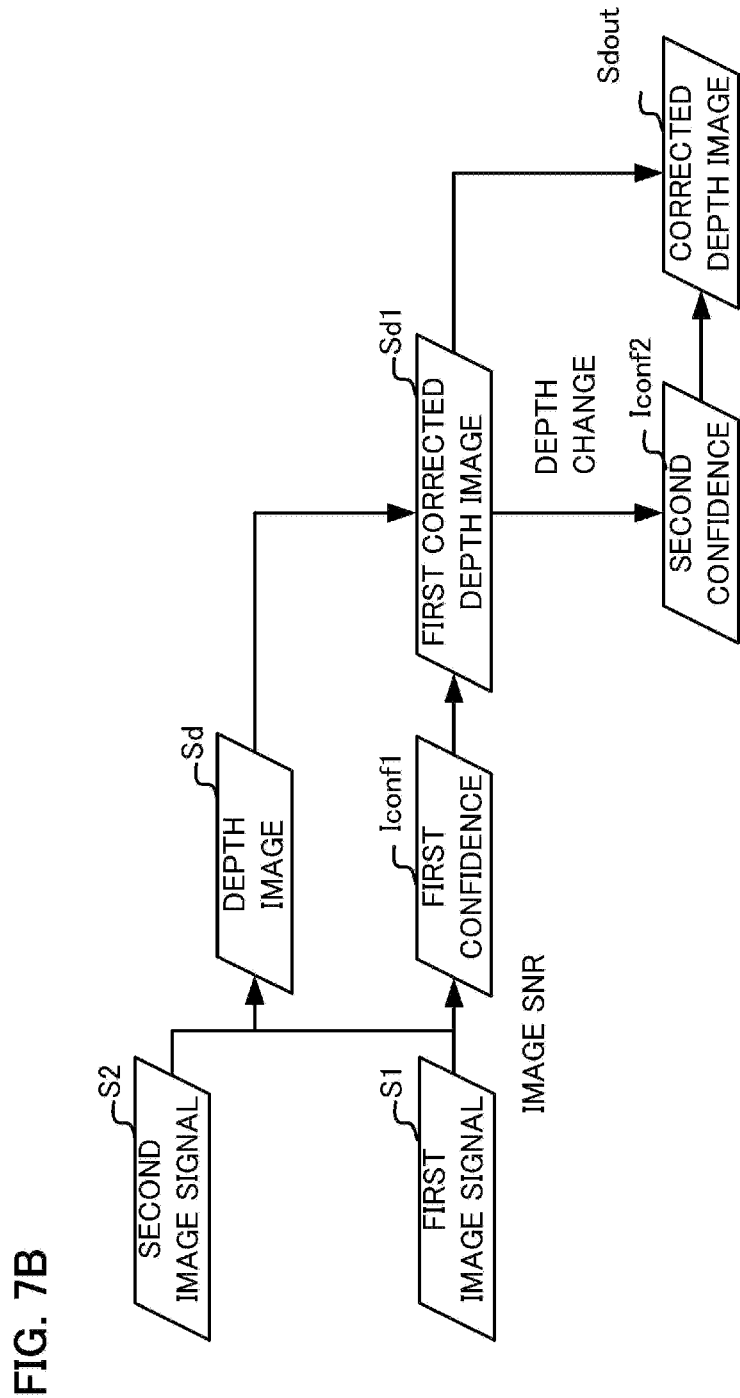

A depth image generation apparatus 110 according to Embodiment 2 of the present invention will be described. FIG. 7A is a flow chart depicting an operation of the depth image generation processing which is performed by the depth image generation apparatus 110 according to this embodiment. FIG. 7B is a data flow chart in the depth image generation processing.

In this embodiment, the depth image generation apparatus 110 includes the depth image generation unit 112 and the depth image correction unit 111, just like Embodiment 1. The depth image generation unit 112 according to this embodiment generates the correction information Iconf including the depth image Sd, the first confidence Iconf1 and the second confidence Iconf2, in the same manner as Embodiment 1. The depth image correction unit 111 according to this embodiment performs the first depth correction processing based on the first confidence Iconf1 and the second depth correction processing based on the second confidence Iconf2, in the same manner as Embodiment 1. A difference from Embodiment 1 is that the second confidence Iconf2 is generated based on the first corrected depth image Sd1.

The depth image generation processing S330, the first confidence generation processing S341, and the first depth correction processing S350 in FIG. 7A are the same as Embodiment 1, hence description thereof is omitted.

In the second confidence information generation processing S770 according to this embodiment, the generation unit 112 generates the second confidence Iconf2 from the first corrected depth image Sd1. In concrete terms, the generation unit 112 sets a reference region centering around a confidence calculation pixel in the first corrected depth image Sd1, and calculates the variance of the first corrected depth image Sd1 included in the reference region as the second confidence Iconf2 of the confidence calculation target pixel. The second confidence Iconf2 based on the other calculation methods, as described in Embodiment 1, may also be used. In other words, this processing is the same as Embodiment 1, except that the depth image to be used is the first corrected depth image Sd1.

In this embodiment, the second confidence is generated from the first corrected depth image Sd1 after the first depth correction processing S350 is performed using the first confidence. The first corrected depth image Sd1 generated in the first depth correction processing S350 is a depth image, in which the object depth in a region, in which the reliability in the first confidence is low, has been corrected. In other words, the first corrected depth image Sd1 is a depth image having even higher accuracy than the depth image Sd. By generating the second confidence based on a more accurate first corrected depth image, reliability in the in-plane position of the object depth can be even more accurately evaluated. As a result, the correction error of the object depth in the second depth correction processing S360 can be reduced, and an even more accurate corrected depth image Sdout can be generated.

Embodiment 3

A depth image generation apparatus according to Embodiment 3 of the present invention will be described. In this embodiment, instead of correcting the depth values considering the depth difference in the first depth correction processing, the depth image is divided into a plurality of layers in accordance with the depth values, and correction is performed using the depth values on a same layer.

FIG. 8A is a flow chart depicting the operation of the depth image generation apparatus 110. A difference from Embodiment 1 is that the layer division processing S870 is added. Further, the processing content to be executed is different between the first depth correction processing S350 in Embodiment 1 and the first depth correction processing S850 of this embodiment. The depth image generation processing S330, the correction information generation processing S340, and the second depth correction processing S360 are the same as Embodiment 1. In the following, description on aspects the same as Embodiment 1 will be omitted, and only aspects that are difference from Embodiment 1 will be described.

The layer division processing S870 and the first depth correction processing S850 will be described with reference to FIG. 8B and FIG. 8C.

First the layer division processing S870 will be described with reference to FIG. 8B. In step S871, the correction unit 111 calculates the frequency distribution of the object depth using the depth image Sd.

In step S872, the correction unit 111 sets a plurality of boundary values to perform the layer division based on the frequency distribution information. In this embodiment, a case of dividing the depth image into three layers (one layer including the main object, one layer before this layer, and one layer after this layer), will be described as an example. In the following description, it is assumed that the layer on the front side of the main object is the first layer, the layer including the main object is the second layer, and the layer on the rear side of the main object is the third layer. Since the depth image is divided into three layers, two boundary values are set between the first layer and the second layer, and between the second layer and the third layer. In concrete terms, two depth values which are closest to the object depth representing the main object and of which frequency is the minimum are set as: a first boundary value to divide the first layer and the second layer; and a second boundary value to divide the second layer and the third layer. In the case of normal photographing using a digital camera, the focal point of the image forming optical system 120 is often set to the main object. Therefore it is desirable that the object depth representing the main object is an object depth corresponding to defocus amount=0.

In step S873, the correction unit 111 divides the depth image into the first layer, the second layer and the third layer based on the first boundary value and the second boundary value, so as to generate the layer information Ilayer. The layer information Ilayer is information on which layer each pixel of the depth image Sd belongs to.

The first depth correction processing S850 according to this embodiment will be described next with reference to FIG. 8C. In step S851, the correction unit 111 calculates the weight coefficients used for correction of the object depth using the first confidence Iconf1 and the layer information Ilayer. In concrete terms, the correction unit 111 sets the weight coefficients of pixels which belong to the same layer as the layer where the target point belongs, out of each pixel included in a reference region centering around the target point (correction target pixel) in the depth image Sd, so that the larger value is set as the first confidence Iconf1 is higher. For the pixels belonging to a layer that is different from the layer where the target point belongs, weight coefficient=0 is set. In other words, the weight coefficients are set such that contribution to the correction value of the object depth increases as the first confidence Iconf1 is higher, and an object depth belonging to other layers does not contribute to the correction value.

In step S352, the correction unit 111 calculates a weighted mean value of the depth value using the weights determined as above, as the corrected object depth of the target point. In step S353, the correction unit 111 saves the generated first corrected depth image Sd1 in memory. The processing in steps S352 and S353 are the same as Embodiment 1.

The depth image generation apparatus 110 of this embodiment divides the depth image Sd into a plurality of layers based on the depth values, and performs correction using only the depth values belonging to a layer the same as the layer of the target point. Thereby in the first depth correction processing S850 in this embodiment, the first corrected depth image can be generated with less computing amount, since it is unnecessary to calculate the depth difference each time a target point is set. As a result, a corrected depth image can be generated at even higher speed.

In the layer division processing S870 of this embodiment, the depth image Sd is divided into three layers, but the number of division may be more than three. For example, the depth image Sd may be divided into five layers by inserting a fourth layer between the first layer and the second layer, and a fifth layer between the second layer and the third layer. In the case of dividing the depth image Sd into five layers, four boundary values are calculated in step S872. In concrete terms, the third boundary value is set at a predetermined distance distant from the first boundary value, and the fourth boundary value is set at a predetermined distance distant from the second boundary value. In step S873, the first boundary value is used as a boundary value to separate the first layer and the fourth layer. The third boundary value is used as a boundary value to separate the fourth layer and the second layer. The fourth boundary value is used as a boundary value to separate the second layer and the fifth layer. And the second boundary value is used as a boundary value to separate the fifth layer and the third layer. It is not always necessary to determine four boundary values to divide the depth image into five layers, and the fourth layer and the fifth layer may be set within a predetermined distance, including the first boundary value and the second boundary value. By increasing a number of divided layers, the correction error can be further decreased when the reliability in the object depth values in the peripheral region of the target point is low in the first depth correction processing S850. However, if a number of divided layers is excessive, the depth correction effect in the first depth correction processing S850 is diminished. Therefore it is preferable to set the number of divided layers such that the difference between boundary values is greater than the depth resolution of the depth image Sd. It is more preferable to set the number of divided layers to 10 or less.

A concrete procedure of the layer division processing according to this embodiment is not limited to the procedure described with reference to FIG. 8B. Various modifications are possible for a concrete method of the layer division processing.

If the size of the main object in the depth direction is known, the frequency distribution need not be calculated, and the layer division may be performed by determining the boundary values based on the main object depth and the size of the main object in the depth direction. For example, in the case of photographing the portrait of an individual, the size of the individual in the depth direction is assumed to be about 50 cm. In this case, the object depth of the individual is used as a representative value, the range of the representative value ±25 cm is set as the second layer, and the layers before and after this layer are set as the first layer and the third layer respectively.

The above description concerns an embodiment when Embodiment 1 is modified, but this embodiment can also be applied to Embodiment 2.

Embodiment 4

A depth image generation apparatus 110 according to Embodiment 4 of the present invention will be described. In this embodiment, the depth image generation unit 112 determines global confidence Iglobal which indicates global confidence in the depth image Sd, as the correction information Iconf. As mentioned later, the global confidence Iglobal is one index that indicates confidence in the entirety (all the pixels) of the depth image Sd. In this embodiment, the same correction as Embodiment 1 is performed if the global confidence Iglobal is low, but a simpler correction (third depth correction processing S980) is performed if the global confidence Iglobal is high.

Figure 9A:
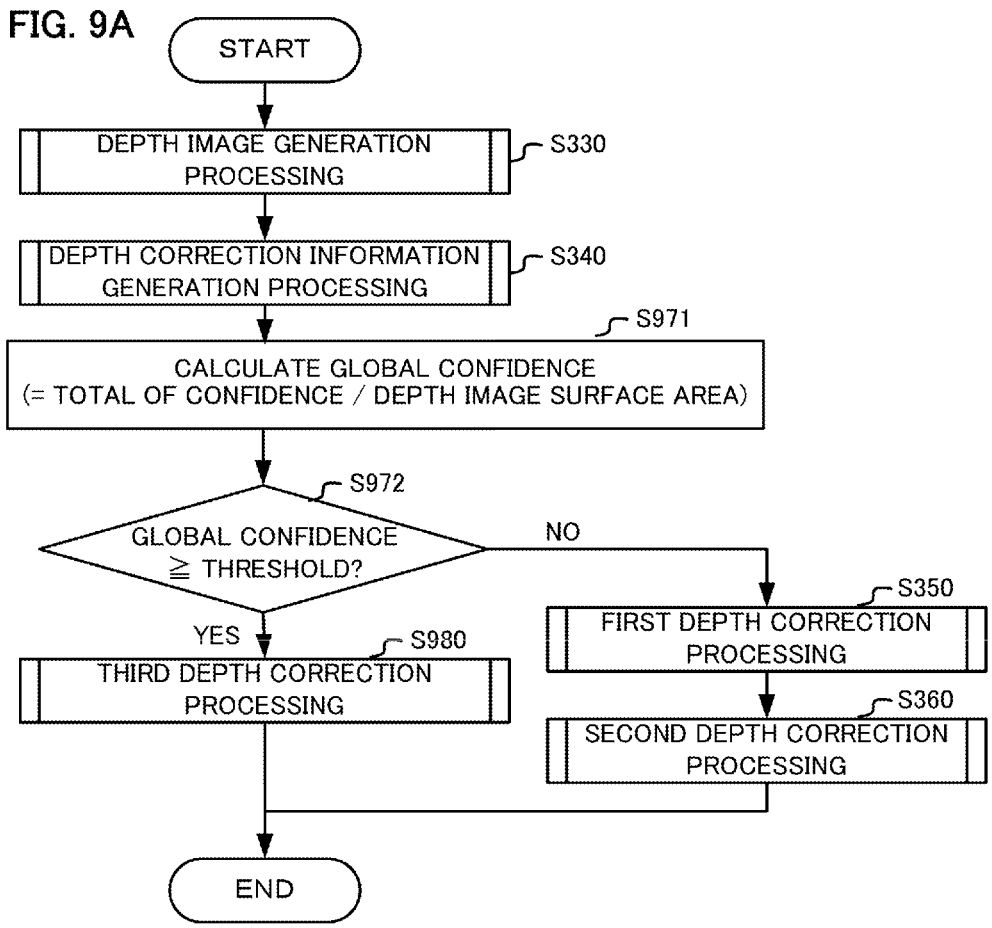
FIGS. 9A and 9B are flow charts depicting the processing performed by the depth image generation apparatus according to Embodiment 4.

FIG. 9A is a flow chart depicting the operation of the depth image generation apparatus 110 according to this embodiment. The depth image generation processing S330 and the correction information generation processing S340 are the same as Embodiment 1.

In step S971, the generation unit 112 calculates from the depth image Sd an index (global confidence) which indicates global reliability in the depth image Sd. The generation unit 112 calculates the sum of the correction information Iconf first. In concrete terms, the generation unit 112 adds the sum of the first confidence Iconf1 in each pixel position and the sum of the second confidence Iconf2 in each pixel position.

Predetermined conversion processing must be performed on the first confidence and the second confidence, so that the reliability is higher as the value increases. For example, in the case of generating the second confidence Iconf2 in the step S342 in FIG. 4B, the reliability is lower as the value increases. In such a case, the negative-positive inversion processing is performed.

Here the total of the sum of the first confidence Iconf1 and the sum of the second confidence Iconf2 is determined, however the sum or mean of the mean value of the first confidence Iconf1 and the mean value of the second confidence Iconf2 may be determined instead. Further, in order to make the contribution of the first confidence and the contribution of the second confidence to the global confidence Iglobal similar, it is preferable that at least one of the first confidence and the second confidence is normalized using a predetermined constant in advance.

The generation unit 112 regards a value generated by normalizing the total of the confidence values by the surface area of the depth image Sd as the global confidence Iglobal, so that consistent determination is performed regardless of the image size of the depth image Sd. The surface area of the depth image Sd is acquired by calculating a number of pixels included in the depth image Sd. If a number of pixels of the depth image Sd is known, the number of pixels need not be calculated, and a predetermined value may be used.

In step S972, the correction unit 111 determines whether the global confidence Iglobal is a predetermined threshold or more. If the global confidence is lower than the threshold (NO in S972), the first depth correction processing S350 and the second depth correction processing S360 are performed, just like Embodiment 1. If the global confidence is the threshold or more (YES in S972), on the other hand, the third depth correction processing S980 is performed.

Figure 9B:
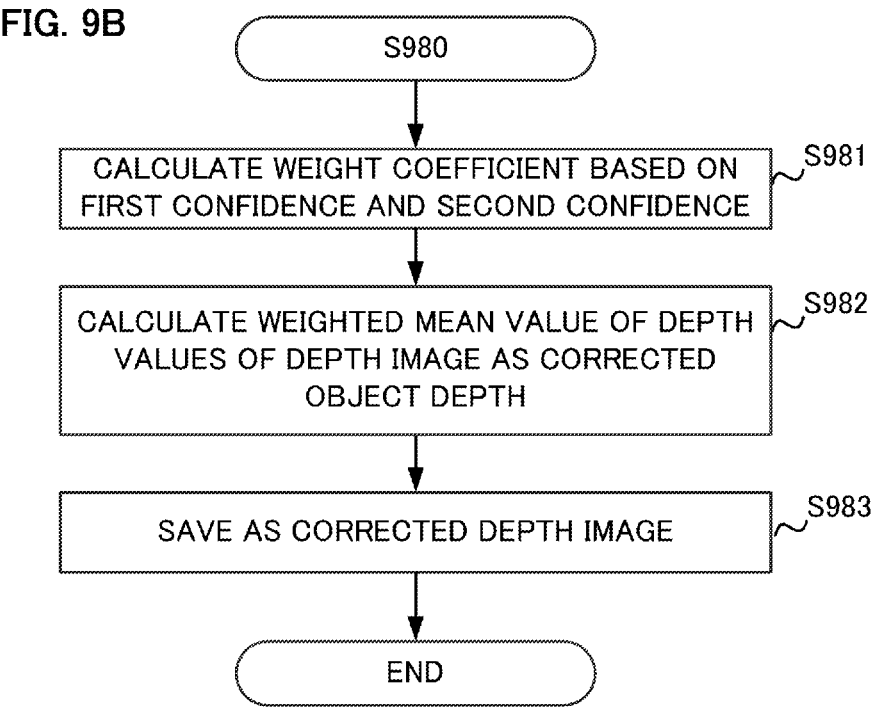

The third depth correction processing S980 will be described with reference to FIG. 9B. In the third depth correction processing S980, the depth image Sd is corrected using both the first confidence Iconf1 and the second confidence Iconf2 at the same time. First in step S981, the correction unit 111 calculates weight coefficients to be used for correction of the object depth, using the first confidence Iconf1 and the second confidence Iconf2 included in the correction information Iconf. In concrete terms, the correction unit 111 sets the weight coefficient of each pixel included in the reference region centering around the target point (correction target pixel) in the depth image Sd to a value that is larger as the reliability indicated by the first confidence Iconf1 and the second confidence Iconf2 is higher. In other words, for a neighboring region of the target point, each weight coefficient is determined so as to have a larger value as the reliability indicated by the first confidence Iconf1 is higher, and to have a larger value as the reliability indicated by the second confidence Iconf2 is higher. Thereby an object depth, in which the first confidence Iconf1 and the second confidence Iconf2 are higher, has a larger contribution to the correction value of the object depth.

In step S982, the correction unit 111 calculates the weighted mean value of the object depth values included in the reference region using the weight coefficients, and regards this weighted mean value as the corrected object depth of the target point. In the third depth correction processing S980, the corrected object depth is calculated at each pixel, while sequentially moving the target point, whereby the corrected depth image Sdout, in which each pixel value has corrected object depth, is generated. In step S983, the correction unit 111 saves the generated corrected depth image Sdout in memory, or outputs the corrected depth image Sdout to an external apparatus.

When the global reliability in the object depth values included in the depth image Sd is low, it is more likely that the reliability indicated by the correction information Iconf on the peripheral region of the target point, used for correction of the object depth, is low. In such a case, it is preferable that a different object depth correction method is used in accordance with the factors which caused incorrect evaluation of correction. On the other hand, when the global reliability in the object depth values included in the depth image Sd is high, it is more likely that the reliability indicated by the correction information Iconf on the peripheral region of the target point, used for correction of the object depth, is high. In such a case, the object depth may be corrected without considering the factors which caused incorrect evaluation of correlation. The global confidence Iglobal can be regarded as an index which indicates the likelihood that the depth correction will be accurately performed by one correction.

In the third depth correction processing S980, the corrected depth image Sdout is generated by one correction processing. Compared with the case of sequentially performing the first depth correction processing S350 and the second depth correction processing S360, a number of times of correction for each pixel is low in the third depth correction processing S980, therefore the corrected depth image Sdout can be generated at even high speed. In other words, in this embodiment, the depth image can be corrected even at higher speed when the global reliability in the depth image Sd is high.

The above description concerns an embodiment when Embodiment 1 is modified, but this embodiment can also be applied to Embodiment 2 or Embodiment 3 (and modifications thereof). In the case of applying this embodiment to Embodiment 3 where the depth image is divided into layers, the global confidence may be calculated for each layer, or one global confidence may be calculated for the depth image. If the global confidence is calculated for each layer, the content of the correction processing to be applied to each layer is changed based on the global confidence in the layer. If one global confidence is calculated for the depth image, the content of the correction processing to be applied to all the layers is changed based on the global confidence. The global confidence in the entire depth image, when the depth image is divided into layers, is preferably a value based on the minimum value (value indicating the lowest reliability) of the global confidence information calculated for each layer, so as to decrease dependency on the object and the photographing conditions. Now a case of photographing a portrait of an individual, where the confidence Iconf in the main object is high, but the confidence Iconf in the background region, other than the main object, is low, will be considered. In this case, it is determined that the global confidence is high if a surface area occupied by the main object in the depth image Sd is large, but the object depth correction error may occur since the background region has few regions with high confidence Iconf. If a minimum value of the global confidence in each layer is used, it can be determined that the global reliability in the depth image Sd is low, even if the surface area ratio of the background region having low reliability is low.

Other Embodiments

In the above embodiments, the depth image generation apparatus is incorporated into the imaging apparatus, but this is not essential. The depth image generation apparatus may be configured as an apparatus that is separate from the imaging apparatus, and may generate and correct the depth image based on an image acquired by the imaging apparatus. Further, in the above embodiments, the depth image generation apparatus generates the depth image Sd, but the depth image Sd need not always be generated by the depth image generation apparatus. The depth image generation apparatus (depth image correction apparatus) may acquire the depth image Sd and at least one of the image signals S1 and S2, or the correction information Iconf from an external apparatus, and correct the acquired depth image Sd based on the photographed images S1 and S2, or the correction information Iconf.

The present invention can be constituted by such a general processor as a microprocessor and a central processing unit (CPU), and a computer including a program stored in memory, and be implemented by the general processor executing this program. The present invention may be implemented by such a dedicated processor as an application specific integrated circuit (ASIC), a field programmable gate array (FPGA) and a digital signal processor (DSP). Both a dedicated processor and a general processor which executes a program can be regarded as a processor which is configured to provide specific functions. Some of the functions of the present invention may be provided by a general processor (and program), and the remainder of the functions may be implemented by a dedicated processor. Further, a certain function of the present invention may be implemented by both a general processor (and program) and a dedicated processor.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention can also be understood as a program that is executed by a general processor, causing the general processor to execute the above mentioned processing, or a non-transitory computer-readable storage medium storing such a program.

While the present invention has been described with reference to exemplary embodiments, it is to be understood that the invention is not limited to the disclosed exemplary embodiments. The scope of the following Claims is to be in accord with the broadest interpretation so as to encompass all such modifications and equivalent structures and functions.

This application claims benefit of Japanese Patent Application No. 2016-19227, filed on Feb. 3, 2016, which is hereby incorporated by reference herein in its entirety.

What is claimed is:

1. A depth image correction apparatus to correct depth information in a depth image, the depth image correction apparatus comprising:
a memory that stores a program; and
a processor that executes the program to perform a procedure comprising:
(1) acquiring (a) a depth image in which depth information to indicate depth values of depth to an object in a depth direction at a plurality of pixel positions is stored, and (b) correction information to correct the depth image; and
(2) correcting the depth values of the depth image based on the correction information and to generate a corrected depth image,
wherein the acquiring acquires, as the correction information, (a) a first confidence which indicates reliability in the depth values of the depth image, the first confidence being determined in accordance with a signal-to-noise ratio of an image signal, and (b) a second confidence which indicates reliability of position of the depth image in an in-plane direction vertical to the depth direction, and
wherein the correcting comprises (a) first correction processing of generating a first corrected depth image by correcting the depth image based on the first confidence and similarity between a depth value of a correction target pixel of the depth image and a depth value of another pixel of the depth image, and (b) second correction processing of generating the corrected depth image by correcting the first corrected depth image based on the second confidence.

2. The depth image correction apparatus according to claim 1, wherein the second confidence is generated based on the depth image or the first corrected depth image.

3. The depth image correction apparatus according to claim 1, wherein the correcting generates layer information indicating division of the depth image into a plurality of layers each of which includes similar depth values, and corrects the depth image in the first correction processing, based on the depth values of the pixels belonging to the same layer as the correction target pixel, the first confidence, and the similarity.

4. The depth image correction apparatus according to claim 3, wherein the correcting sets a plurality of boundary values for dividing the depth image into layers based on frequency distribution of the depth image, and divides the depth image into a plurality of layers based on the boundary values.

5. The depth image correction apparatus according to claim 3, wherein the correcting sets a representative value of the depth values determined from the depth image, sets predetermined boundary values for dividing the depth image into layers based on the size of the object in the depth direction, and divides the depth image into a plurality of layers based on the boundary values.

6. The depth image correction apparatus according to claim 1, wherein the first correction processing is processing to set a reference region, which includes the correction target pixel, in the depth image, and to calculate a weighted mean value of the depth values of the pixels in the reference region as a corrected depth value of the correction target pixel, and
wherein a weight coefficient of the weighted mean is larger for a pixel for which the reliability of the first confidence is higher and the depth value differs from the depth value of the correction target pixel by a smaller amount.

7. The depth image correction apparatus according to claim 1, wherein the second correction processing is processing to set a reference region, which includes the correction target pixel, in the first corrected depth image, and to calculate a weighted mean value of the depth values of the pixels in the reference region as a corrected depth value of the correction target pixel, and
wherein a weight coefficient of the weighted mean is larger for a pixel for which the reliability of the second confidence is higher.

8. The depth image correction apparatus according to claim 1, wherein the acquiring acquires a photographed image in which brightness information of the object is stored,
wherein the depth image is corrected in the first correction processing, further based on similarities of the image characteristics of the photographed image, and
wherein the first corrected depth image is corrected in the second correction processing, further based on similarities of the image characteristics of the photographed image.

9. The depth image correction apparatus according to claim 8, wherein the first correction processing is processing to set a reference region, which includes the correction target pixel, in the depth image, and to calculate a weighted mean value of the depth values of the pixels in the reference region as a corrected depth value of the correction target pixel, and
wherein a weight coefficient of the weighted mean is larger for a pixel for which the reliability of the first confidence is higher, the depth value differs from the depth value of the correction target pixel by a smaller amount, or the similarity of the image characteristics is higher.

10. The depth image correction apparatus according to claim 8, wherein the second correction processing is processing to set a reference region, which includes the correction target pixel, in the first corrected depth image, and to calculate a weighted mean value of the depth values of the pixels in the reference region as a corrected depth value of the correction target pixel, and
wherein a weight coefficient of the weighted mean is larger for a pixel for which the reliability of the second confidence is higher and the similarity of the image characteristics is higher.

11. The depth image correction apparatus according to claim 8, wherein the similarity of the image characteristics of the photographed image is calculated based on the color difference or brightness difference of the photographed image.

12. The depth image correction apparatus according to claim 8, wherein the similarity of the image characteristics of the photographed image is calculated based on the statistical amount of the photographic image.

13. The depth image correction apparatus according to claim 1, wherein the correction information further includes global confidence which indicates global reliability in the depth image, and
wherein the correcting (a) performs the first correction processing and the second correction processing when the global confidence is lower than a threshold, and (b) performs third correction processing of generating the corrected depth image by correcting the depth image based at least on the first confidence and the second confidence, when the global confidence is the threshold or more.

14. The depth image correction apparatus according to claim 13, wherein the global confidence is generated based on a ratio of a sum or mean value of the first confidence and the second confidence to a surface area of the depth image.

15. The depth image correction apparatus according to claim 13, wherein the correction information includes the global confidence for each of a plurality of layers generated by dividing the depth image based on the similarity of depth values, and
wherein the correcting determines, for each layer, whether the first correction processing and the second correction processing are to be performed or the third correction processing is to be performed.

16. The depth image correction apparatus according to claim 13, wherein the correction information includes the global confidence for each of a plurality of layers generated by dividing the depth image based on the similarity of depth values, and
wherein the correcting determines whether the first correction processing and second correction processing are to be performed or the third correction processing is to be performed based on the global confidence in which reliability is lowest.

17. The depth image correction apparatus according to claim 13, wherein in the third correction processing, the depth image is corrected using at least one of the similarity of the depth values and the similarity of the image characteristics of the photographed image in which brightness information of the object acquired by the acquiring unit is stored.

18. An imaging apparatus comprising:
an image pickup element, wherein the imaging apparatus generates a depth image from an image photographed by the image pickup element; and
the depth image correction apparatus according to claim 1.

19. A depth image correction method to correct depth information in a depth image, the method comprising:
an acquisition step of acquiring a depth image in which depth information to indicate depth values of depth to an object in a depth direction at a plurality of pixel positions is stored, and correction information to correct the depth image; and
a correction step of correcting the depth values of the depth image based on the correction information and generating a corrected depth image,
wherein the acquisition step includes a step of acquiring, as the correction information, (a) a first confidence which indicates reliability in the depth values of the depth image, the first confidence being determined in accordance with a signal-to-noise ratio of an image signal, and (b) a second confidence which indicates reliability of position of the depth image in an in-plane direction vertical to the depth direction, and
wherein the correction step includes a step of performing (a) first correction processing of generating a first corrected depth image by correcting the depth image based on the first confidence and similarity between a depth value of a correction target pixel of the depth image and a depth value of another pixel of the depth image, and (b) second correction processing of generating the corrected depth image by correcting the first corrected depth image based on the second confidence.

20. A non-transitory computer-readable storage medium storing a program for causing a computer to execute each step of a depth image correction method to correct depth information in a depth image, the method comprising:
an acquisition step of acquiring a depth image in which depth information to indicate depth values of depth to an object in a depth direction at a plurality of pixel positions is stored, and correction information to correct the depth image; and
a correction step of correcting the depth values of the depth image based on the correction information and generating a corrected depth image,
wherein the acquisition step includes a step of acquiring, as the correction information, (a) a first confidence which indicates reliability in the depth values of the depth image, the first confidence being determined in accordance with a signal-to-noise ratio of an image signal, and (b) a second confidence which indicates reliability of position of the depth image in an in-plane direction vertical to the depth direction, and
wherein the correction step includes a step of performing (a) first correction processing of generating a first corrected depth image by correcting the depth image based on the first confidence and similarity between a depth value of a correction target pixel of the depth image and a depth value of another pixel of the depth image, and (b) second correction processing of generating the corrected depth image by correcting the first corrected depth image based on the second confidence.

21. The depth image correction apparatus according to claim 1, wherein the second confidence is generated based on a change of the depth values in the depth image.

22. The depth image correction apparatus according to claim 1, wherein the second confidence is generated based on a variance of the depth values in the depth image.

* * * * *